US012748490B2

(12) United States Patent
Won et al.

(10) Patent No.: US 12,748,490 B2
(45) Date of Patent: Sep. 29, 2026

(54) ELECTRONIC DEVICE FOR OUTPUTTING IMAGE BASED ON RESULT OF PREDICTING FUTURE EYE POSITION AND METHOD PERFORMED BY THE SAME

(71) Applicant: Samsung Electronics Co., Ltd., Suwon-si (KR)

(72) Inventors: Kwanghyun Won, Suwon-si (KR); Cheolseong Park, Suwon-si (KR); Youngho Oh, Suwon-si (KR); Woongil Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/016,442

(22) Filed: Jan. 10, 2025

(65) Prior Publication Data

US 2025/0224803 A1 Jul. 10, 2025

Related U.S. Application Data

(63) Continuation of application No. PCT/KR2025/000341, filed on Jan. 7, 2025.

(30) Foreign Application Priority Data

Jan. 8, 2024 (KR) ........................ 10-2024-0003120

(51) Int. Cl.
*G06F 3/01* (2006.01)
*G06T 7/20* (2017.01)
(Continued)

(52) U.S. Cl.
CPC ................ *G06F 3/013* (2013.01); *G06T 7/20* (2013.01); *G06T 7/70* (2017.01);
(Continued)

(58) Field of Classification Search
None
See application file for complete search history.

(56) References Cited

U.S. PATENT DOCUMENTS 9,690,099 B2 6/2017 Bar-Zeev et al.
10,115,204 B2 * 10/2018 Lee ........................... G06T 7/73
(Continued)

FOREIGN PATENT DOCUMENTS

CA 3038584 A1 * 10/2020 ............. G06F 3/013
KR 10-2020-0110367 A 9/2020
(Continued)

OTHER PUBLICATIONS

J Lawrence et al., Project Starline: A high-fidelity telepresence system, Google Research, USA, 2021.
(Continued)

*Primary Examiner* — Tyler W. Sullivan
(74) *Attorney, Agent, or Firm* — Jefferson IP Law, LLP

(57) ABSTRACT

A method performed by an electronic device is provided. The method includes obtaining position information of a target part corresponding to past and reference time points, from an image that includes a facial region of a viewer and is input through a camera, obtaining position change information of the target part corresponding to the reference time point, based on the position information, predicting a future velocity of the target part based on the position change information, obtaining velocity change information of the target part corresponding to the reference time point, based on the position change information, predicting a future acceleration of the target part based on the velocity change information, predicting future positions of both eyes corresponding to a target time point based on the future velocity
(Continued)

and the future acceleration, and outputting an image based on the future positions of the eyes corresponding to the target time point.

20 Claims, 15 Drawing Sheets

(51) Int. Cl.
*G06T 7/70* (2017.01)
*H04N 13/122* (2018.01)
*H04N 13/383* (2018.01)

(52) U.S. Cl.
CPC ............... *G06T 2207/10004* (2013.01); *G06T 2207/20024* (2013.01); *G06T 2207/30201* (2013.01); *H04N 13/122* (2018.05); *H04N 13/383* (2018.05)

(56) References Cited

U.S. PATENT DOCUMENTS

| | | | | |
|---|---|---|---|---|
| 10,559,276 | B2 | 2/2020 | Fruchter et al. | |
| 10,871,825 | B1 | 12/2020 | Sztuk et al. | |
| 11,112,863 | B2 | 9/2021 | Miller et al. | |
| 11,132,056 | B2 | 9/2021 | Sztuk et al. | |
| 11,238,340 | B1 | 2/2022 | Anderson et al. | |
| 11,543,665 | B2 | 1/2023 | Bleyer et al. | |
| 11,669,160 | B2 | 6/2023 | Sztuk et al. | |
| 11,869,386 | B2 * | 1/2024 | Pradhan | A61B 5/4088 |
| 2019/0339770 | A1 | 11/2019 | Kurlethimar et al. | |
| 2019/0354173 | A1 | 11/2019 | Young et al. | |
| 2020/0257361 | A1 | 8/2020 | Kang et al. | |

FOREIGN PATENT DOCUMENTS

| | | | | |
|---|---|---|---|---|
| KR | 10-2022-0120571 A | | 8/2022 | |
| KR | 10-2564479 B1 | | 8/2023 | |
| WO | WO-2023219916 A1 | * | 11/2023 | G09G 3/3611 |

OTHER PUBLICATIONS

Joseph J. LaViola Jr; Double Exponential Smoothing: An Alternative to Kalman Filter-Based Predictive Tracking, The Eurographics Association 2003.
https://en.wikipedia.org/wiki/Exponential_smoothing.

* cited by examiner

ELECTRONIC DEVICE FOR OUTPUTTING IMAGE BASED ON RESULT OF PREDICTING FUTURE EYE POSITION AND METHOD PERFORMED BY THE SAME

CROSS-REFERENCE TO RELATED APPLICATION(S)

This application is a continuation application, claiming priority under § 365 (c), of an International application No. PCT/KR2025/000341, filed on Jan. 7, 2025, which is based on and claims the benefit of a Korean patent application number 10-2024-0003120, filed on Jan. 8, 2024, in the Korean Intellectual Property Office, the disclosure of which is incorporated by reference herein in its entirety.

TECHNICAL FIELD

The disclosure relates to an electronic device for outputting an image based on a result of predicting a movement of a viewer, and a method performed by the electronic device.

BACKGROUND ART

Special types of lenses, such as lenticular lenses, may be used to create three-dimensional (3D) effects, optical effects, or other visual effects in a display area. By utilizing the characteristics of lenticular lenses, a display device may output a plurality of images such that different images are observed depending on the viewing position of a viewer. For example, the display device may output a first image to pixels viewable at a first viewing position and simultaneously output a second image to pixels viewable at a second viewing position. In this case, the viewer may observe the first image at the first viewing position, and observe the second image at the second viewing position.

By utilizing the characteristics of lenticular lenses, the display device may provide 3D images to the viewer, as a glasses-free 3D display device. Due to the characteristics of lenticular lenses, the viewer's left and right eyes may observe different images. For example, the display device may output a first image to pixels viewable to the viewer's left eye and simultaneously output a second image to pixels viewable to the viewer's right eye. In this case, the viewer may perceive that he or she is observing a 3D image due to the difference between the first image observed by the viewer's left eye and the second image observed by the viewer's right eye.

The above information is presented as background information only to assist with an understanding of the disclosure. No determination has been made, and no assertion is made, as to whether any of the above might be applicable as prior art with regard to the disclosure.

DISCLOSURE

Technical Solution

An aspect of the disclosure is to provide a method, a system, a device, or a computer program stored in a computer-readable storage medium.

Additional aspects will be set forth in part in the description which follows and, in part, will be apparent from the description, or may be learned by practice of the presented embodiments.

In accordance with an aspect of the disclosure, a method performed by an electronic device is provided. The method includes obtaining, by the electronic device, position information of a target part corresponding to a past time point, and position information of the target part corresponding to a reference time point, from an image that includes a facial region of a viewer and is input through a camera, obtaining, by the electronic device, position change information of the target part corresponding to the reference time point, based on the position information of the target part corresponding to the past time point, and the position information of the target part corresponding to the reference time point, predicting, by the electronic device, a future velocity of the target part based on the position change information of the target part corresponding to the reference time point, and position change information of the target part corresponding to the past time point, obtaining, by the electronic device, velocity change information of the target part corresponding to the reference time point, based on the position change information of the target part corresponding to the reference time point, and the position change information of the target part corresponding to the past time point, predicting, by the electronic device, a future acceleration of the target part based on the velocity change information of the target part corresponding to the reference time point, and velocity change information of the target part corresponding to the past time point, predicting, by the electronic device, future positions of both eyes corresponding to a target time point based on the future velocity and the future acceleration, and outputting, by the electronic device, an image based on the future positions of the eyes corresponding to the target time point.

In accordance with another aspect of the disclosure, one or more non-transitory computer-readable storage media storing one or more computer programs including computer-executable instructions that, when executed by one or more processors of an electronic device individually or collectively, cause the electronic device to perform operations are provided. The operations include obtaining, by the electronic device, position information of a target part corresponding to a past time point, and position information of the target part corresponding to a reference time point, from an image that includes a facial region of a viewer and is input through a camera, obtaining, by the electronic device, position change information of the target part corresponding to the reference time point, based on the position information of the target part corresponding to the past time point, and the position information of the target part corresponding to the reference time point, predicting, by the electronic device, a future velocity of the target part based on the position change information of the target part corresponding to the reference time point, and position change information of the target part corresponding to the past time point, obtaining, by the electronic device, velocity change information of the target part corresponding to the reference time point, based on the position change information of the target part corresponding to the reference time point, and the position change information of the target part corresponding to the past time point, predicting, by the electronic device, a future acceleration of the target part based on the velocity change information of the target part corresponding to the reference time point, and velocity change information of the target part corresponding to the past time point, predicting, by the electronic device, future positions of both eyes corresponding to a target time point based on the future velocity and the future acceleration, and outputting, by the electronic device, an image based on the future positions of the eyes corresponding to the target time point.

In accordance with another aspect of the disclosure, an electronic device is provided. The electronic device includes memory storing one or more computer programs and one or more processors communicatively coupled to the memory, wherein the one or more computer programs include computer-executable instructions that, when executed by the one or more processors individually or collectively, cause the electronic device to obtain position information of a target part corresponding to a past time point, and position information of the target part corresponding to a reference time point, from an image that may include a facial region of a viewer and is input through a camera, obtain position change information of the target part corresponding to the reference time point, based on the position information of the target part corresponding to the past time point, and the position information of the target part corresponding to the reference time point, predict a future velocity of the target part based on the position change information of the target part corresponding to the reference time point, and position change information of the target part corresponding to the past time point, obtain velocity change information of the target part corresponding to the reference time point, based on the position change information of the target part corresponding to the reference time point, and the position change information of the target part corresponding to the past time point, predict a future acceleration of the target part based on the velocity change information of the target part corresponding to the reference time point, and velocity change information of the target part corresponding to the past time point, predict future positions of both eyes corresponding to a target time point based on the future velocity and the future acceleration, and output an image based on the future positions of the eyes corresponding to the target time point.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

Figure 1:
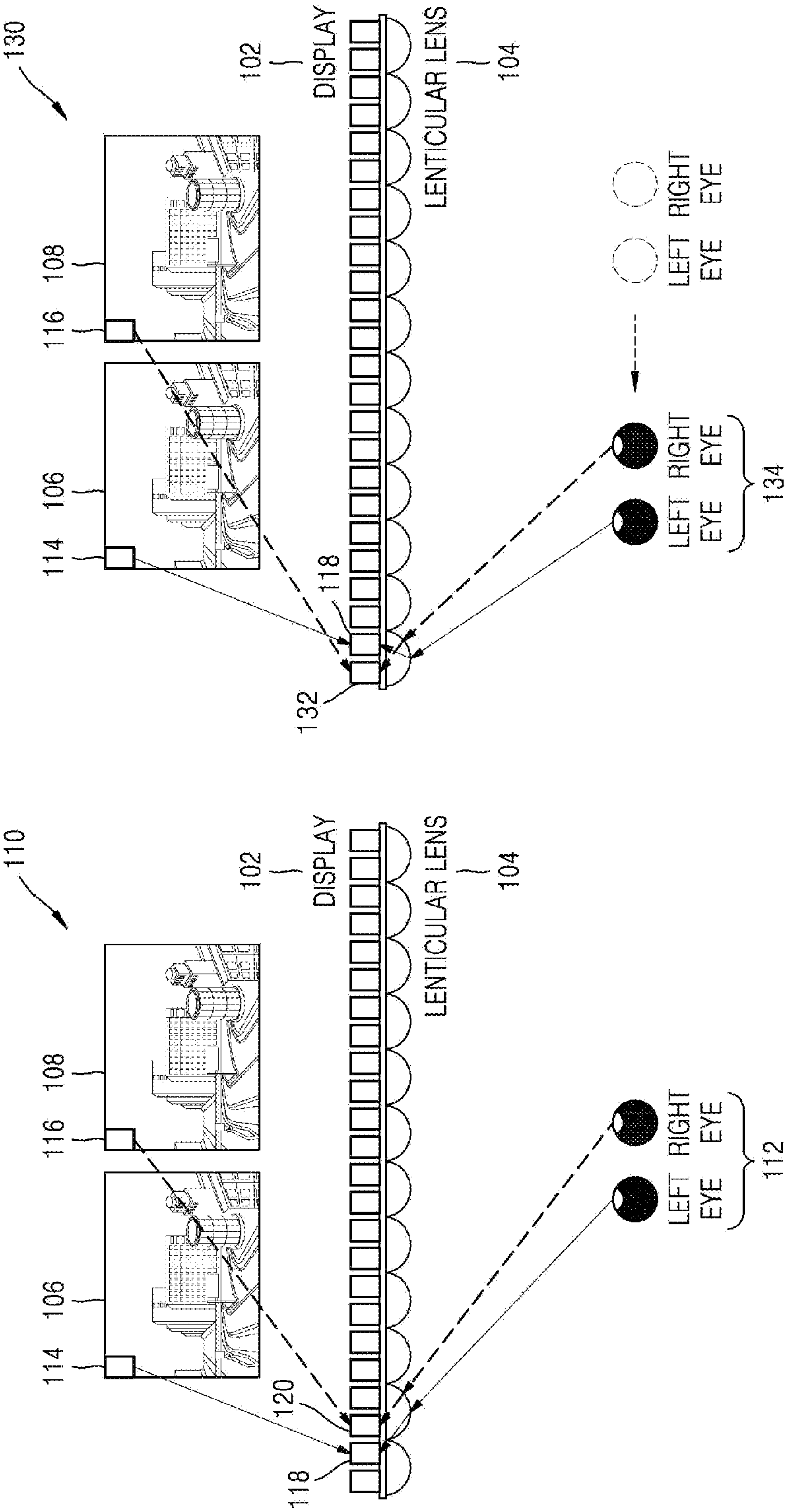
FIG. 1 is a diagram illustrating outputting an image based on a viewing position of a viewer according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein detail can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing an embodiment of the disclosure, detailed descriptions of the related art will be omitted when it is deemed that they may unnecessarily obscure the gist of the disclosure. In addition, ordinal numerals (e.g., 'first' or 'second') used in the description of an embodiment of the disclosure are identifier codes for distinguishing one component from another.

Hereinafter, an embodiment of the disclosure will be described with reference to the accompanying drawings to allow those of skill in the art to easily carry out the embodiment. The disclosure may, however, be embodied in many different forms and should not be construed as being limited to an embodiment set forth herein. Prior to the detailed description of the disclosure, the terms used herein may be defined or understood as follows.

In the disclosure, it should be understood that when components are "connected" or "coupled" to each other, the components may be directly connected or coupled to each other, but may alternatively be connected or coupled to each other with a component therebetween, unless specified otherwise. In addition, 'connection' may include a wireless connection or a wired connection.

In addition, as used herein, a component expressed as, for example, '. . . er (or)', '. . . unit', '. . . module', or the like, may denote a unit in which two or more components are combined into one component or one component is divided into two or more components according to its function. In addition, each component to be described below may additionally perform, in addition to its primary function, some or all of functions of other components take charge of, and some functions among primary functions of the respective components may be exclusively performed by other components.

As used herein, the expression "at least one of a, b, or c" may indicate only a, only b, only c, both a and b, both a and c, both b and c, all of a, b, and c, or variations thereof. In the disclosure, the expression "a or b" may refer to "a", "b", "a and b", or variations thereof. In the disclosure, the expression "a (or, b or c)" or the expression "a, b, or c" may refer to "a", "b", "c", "a and b", "a and c", "b and c", "all of a, b and c", or variations thereof.

In an embodiment of the disclosure, a "time point" may include a time point in units of frames of an input image or an output image.

In an embodiment of the disclosure, a "position" may include a relative position in an input image. For example, a "position" may include coordinate information of a corresponding pixel from among a plurality of pixels included in an input image. For example, a position of a left eye may include coordinate information of a pixel where the left eye is located from among a plurality of pixels included in an input image. For example, the position of the left eye corresponding to a particular time point may include coordinate information of a pixel where the left eye is located from among a plurality of pixels included in a frame image of the input image corresponding to the time point.

In an embodiment of the disclosure, "independent correction" may include correction that does not consider information predicted for other parts (e.g., future position information). For example, "independent correction" may include correction that is independent of information predicted for other parts (e.g., future position information). For example, independent correction may include monocular correction.

In an embodiment of the disclosure, "dependent correction" may include correction that considers information predicted for other parts (e.g., future position information). For example, "dependent correction" may include correction that is dependent on information predicted for other parts (e.g., future position information). For example, "dependent correction" may include correction that uses information predicted for other parts (e.g., future position information). For example, "dependent correction" may include correction based on information predicted for other parts (e.g., future position information). For example, dependent correction may include binocular correction.

In an embodiment of the disclosure, a "target time point" may include a time point corresponding to information (or data) to be predicted. In an embodiment of the disclosure, a "reference time point" may include a most recent time point or a time point closest to the target time point from among one or more time points associated with information used for prediction of the target time point. For example, a "reference time point" may include a current time point. In an embodiment of the disclosure, a "past time point" may include a time point prior to a reference time point. In an embodiment of the disclosure, a "future time point" may include a time point subsequent to a reference time point.

In an embodiment of the disclosure, a value for "the center between both eyes" may include a value predicted with the center between both eyes as a target part, or a value calculated (or determined) based on values for the left and right eyes (e.g., predicted values).

In an embodiment of the disclosure, interpupillary distance (IPD) information may include information about the distance between both eyes that is specific to a viewer, or information about a common distance between both eyes. For example, IPD information may be preset or prestored. For example, IPD information may be updated in real time or periodically. For example, IPD information may be obtained from an image containing a user's face.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

FIG. 1 is a diagram illustrating outputting an image based on a viewing position of a viewer according to an embodiment of the disclosure.

Even when an electronic device (e.g., a display device) renders and outputs the same image (e.g., a light field image) in the same manner, the image actually perceived by the viewer visually may be different depending on the viewing position of the viewer (e.g., a viewpoint). For example, when an output image of the electronic device passes through a special lens (e.g., a lenticular lens or a parallax barrier) to reach the viewer's eyes, an image that is deformed or distorted by the lens may be visually perceived by the viewer, and the image visually perceived by the viewer may vary depending on the viewing position of the viewer. Accordingly, the electronic device may render an output image based on the viewing position of the viewer and output the rendered output image through an image output device (or an image output module) such that an image to be perceived by the viewer (e.g., a target image), that is, an appropriate image, is visually perceived by the viewer.

While the electronic device outputs an image through an image output device (or an image output module), the viewing position of the viewer may change due to a movement of the viewer. In an embodiment of the disclosure, the electronic device may identify (or, detect or obtain) a viewing position changed due to a movement of the viewer, render an output image based on the changed viewing position, and output the rendered output image through an image output device (or an image output module). For example, the electronic device may track the viewing position of the viewer in real time, and render and output an output image in real time based on the viewing position that may change in real time.

In an embodiment of the disclosure, in order to detect or track the viewing position of the viewer (or a change in the viewing position of the viewer), the electronic device may receive an image including the viewer. For example, the electronic device may identify (or, obtain or receive) an image including the viewer, which is input through an image input device (or an image input module). For example, the electronic device may receive (or, obtain or identify) an image including the viewer from an image input device (or an image input module). For example, in order to detect or track the viewing position of the viewer (or a change in the viewing position of the viewer) in real time, the electronic device may identify (or, obtain or receive) a real-time image including the viewer.

Referring to FIG. 1, an electronic device (e.g., a display device) may include a display 102 and a lenticular lens 104. The electronic device may output an image 106 to be perceived by the left eye, to pixels perceived by the left eye from among a plurality of pixels included in the display 102, and output an image 108 to be perceived by the right eye, to pixels perceived by the right eye. From among the plurality of pixels included in the display 102, the pixels perceived by the left eye and the pixels perceived by the right eye may vary depending on the viewing position of the viewer.

In order to provide an image appropriate for the viewer at a first viewing position 112 at a first time point 110 of FIG. 1, the electronic device may render (or generate) an output image such that data of a particular region 114 of the image 106 is output to a first pixel 118 of the display 102, and data of a particular region 116 of the image 108 is output to a second pixel 120 of the display 102. When the electronic device outputs a rendered output image on the display 102, due to the optical characteristics (e.g., refractive characteristics) of a lenticular lens, the region of the first pixel 118 of the output image may be perceived by the left eye of the viewer at the first viewing position 112, and the region of the second pixel 120 of the output image may be perceived by the right eye of the viewer at the first viewing position 112.

When the electronic device outputs an output image rendered in the same manner as at the first time point 110 on the display 102 even though the viewing position of the viewer changes (or moves), a distorted image (or, an inappropriate image or a deformed image) may be visually perceived by the viewer at a different viewing position (e.g., a second viewing position 134) than the first viewing position 112. Thus, the electronic device needs to render an output image in a different manner than at the first time point 110 according to a change in the viewing position of the viewer, and output it on the display 102. For example, in order to provide an image appropriate for the viewer even when the viewing position of the viewer changes at a second time point 130, the electronic device may detect the changed viewing position, that is, the second viewing position 134, and render (or generate) an output image such that data of the particular region 114 of the image 106 is output to the first pixel 118 of the display 102, and data of the particular region 116 of the image 108 is output to a third pixel 132 of the display 102.

Due to a processing time required for the electronic device to detect the viewing position of the viewer in real time from an input image and to newly render and output an output image based on the detected viewing position, there may be a time when an image appropriate for the previous viewing position is output even though the viewing position of the viewer has changed. For example, due to the processing time of the electronic device, there may be a delay between a time point when the viewing position of the viewer changes and a time point when the rendered image is output according to the changed viewing position. During the delay, the electronic device may output an image rendered based on the previously detected viewing position of the viewer, and the viewer may perceive an image that is different from the appropriate image to be perceived (e.g., an inappropriate image, a distorted image, a deformed image, an unnatural or broken image). In order to improve a degradation in the quality of an output image due to a delay, the processing rate for image input (e.g., image sensing), viewing position detection (or tracking), image rendering, and/or image output (e.g., display) may be improved and the required time may be reduced, however, there may be limits to the improvement in processing rate and the reduction in required time.

In an embodiment of the disclosure, there may be provided a method or an electronic device for predicting a viewing position of a viewer at a future time point and outputting a rendered image according to the predicted viewing position. For example, referring to FIG. 1, the electronic device may predict the viewing position of the viewer at the second time point 130 as the second viewing position 134 before reaching the second time point 130, and output an output image rendered for the second viewing position 134 on the display 102 at the second time point 130 (or a frame time corresponding to the second time point 130. Thus, the electronic device may reduce a delay by rendering an image according to a predicted viewing position, and outputting the rendered image on the display 102.

Figure 2:
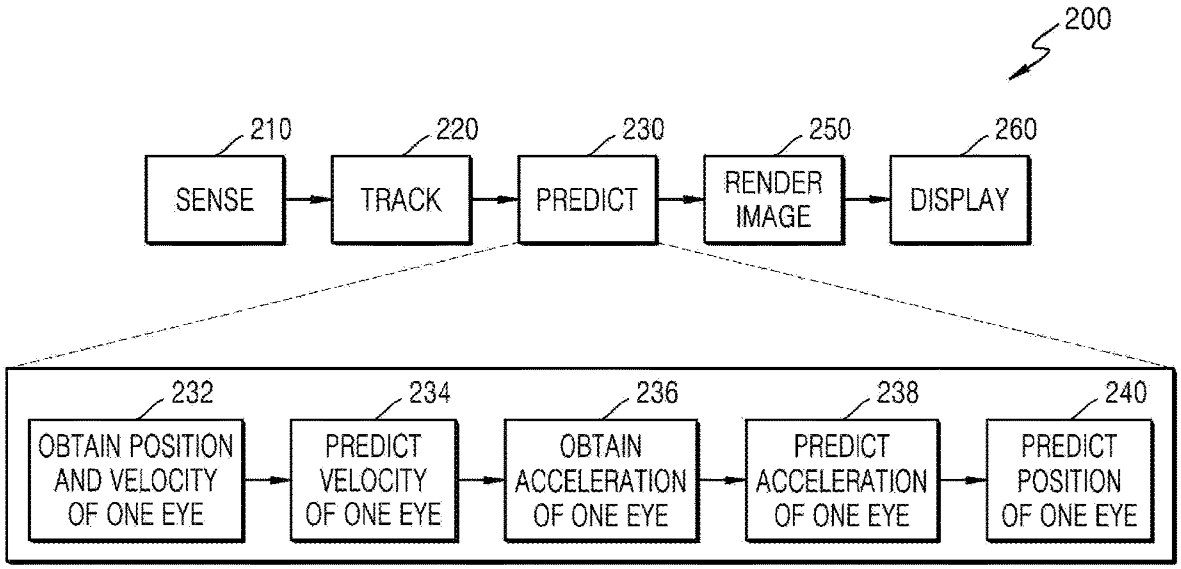
FIG. 2 is a diagram illustrating a method, performed by an electronic device, of displaying an image by predicting a future viewing position of a viewer, according to an embodiment of the disclosure.

FIG. 2 is a diagram illustrating a method, performed by an electronic device, of displaying an image by predicting a future viewing position of a viewer, according to an embodiment of the disclosure.

In describing FIG. 2, redundant descriptions provided above with reference to FIG. 1 may be omitted.

Referring to FIG. 2, in an embodiment of the disclosure, a method 200, performed by an electronic device, of predicting a viewing position of a viewer and displaying an image may include operations 210 to 260. In an embodiment of the disclosure, an electronic device performing the method 200 may include a display device. In an embodiment of the disclosure, operations 210 to 260 of the method 200 may be performed by at least one processor included in the electronic device. In an embodiment of the disclosure, the electronic device may perform the method 200 in real time.

In an embodiment of the disclosure, the electronic device may repeatedly perform the method 200.

In an embodiment of the disclosure, operations 210 to 260 of the method 200 may be performed by a plurality of electronic devices. For example, some operations of the method 200 may be performed by a first electronic device, and other operations may be performed by a second electronic device. The method 200 is not limited to that illustrated in FIG. 2, and in one or more embodiments of the disclosure, the method 200 may further include operations not illustrated in FIG. 2, or some operations may be omitted.

In operation 210, the electronic device may detect a viewer by using an image sensor. For example, the electronic device may include an image input device (or module) (e.g., a camera) that includes a lens and an image sensor. The image sensor may convert light that enters the electronic device through a camera lens into an electrical image signal. For example, the image sensor of the electronic device may detect a viewer.

In an embodiment of the disclosure, the electronic device may obtain (or identify) an image (hereinafter, referred to as an "input image") including a viewer and captured by using an image input device (or module). The image input device that captures an image including a viewer may be positioned (or arranged) to capture a space in which the viewer is positioned to use the electronic device. For example, the electronic device may obtain (or identify) an image including a viewer through (or using) an image input device embedded or included therein. For example, the electronic device may receive an image including a viewer through the image input device. In an embodiment of the disclosure, the electronic device may receive an image including a viewer from an image input device that is connected thereto or capable of communication in a wired or wireless manner.

In operation 220, the electronic device may track (or, identify or detect) the position of a facial region of the viewer in the input image. For example, a tracker (or a tracking module) of the electronic device may track the position of a facial region of a viewer in an input image. For example, the electronic device may track the position of a target part (e.g., the left eye, the right eye, a part between the eyebrows, or a central part between both eyes) included in the viewer's face in the input image.

In operation 230, the electronic device may predict a viewing position of the viewer (e.g., the position of the left eye, the position of the right eye) at a future time point. For example, the electronic device may analyze a movement of the viewer and predict the viewing position of the viewer by using a result of the movement analysis. For example, the electronic device may use accumulated viewing position information of the viewer to predict the viewing position of the viewer at a future time point (hereinafter, referred to as a 'future viewing position of the viewer'). For example, the electronic device may predict a future viewing position of the viewer by using information about the viewing position of the viewer corresponding to a current time point or the viewing position of the viewer corresponding to a past time point.

Referring to FIG. 2, operation 230 may include operations 232 to 240. In an embodiment of the disclosure, the electronic device may perform operations 232 to 240 for the target part. In the following description of operations 232 to 240, it is described that the electronic device performs operations 232 to 240 for one eye (e.g., the right eye or the left eye) as an example of a target part, but the disclosure is not limited thereto. For example, the electronic device may perform at least one of operations 232 to 240 for another target part.

In operation 232, the electronic device may obtain position information and velocity information of one eye. For example, the electronic device may obtain position information and velocity information of one eye in real time from an input image. For example, the electronic device may obtain position information of one eye of the viewer by tracking (or detecting) the position of the eye in an input image. For example, the electronic device may obtain position information of one eye corresponding to a reference time point. For example, the electronic device may filter out noise from the obtained position information of one eye.

For example, the electronic device may obtain velocity information of one eye by using the position information of the eye. For example, the electronic device may obtain a change in the position of one eye as velocity information of the eye. For example, the electronic device may use position information of one eye to calculate or determine the velocity of the eye. For example, the electronic device may obtain velocity information of one eye corresponding to a reference time point. For example, the electronic device may filter out noise from the obtained position information of one eye.

In operation 234, the electronic device may predict (or, calculate or determine) a future velocity of one eye. For example, the electronic device may obtain future velocity information of one eye. For example, the electronic device may predict a velocity of one eye corresponding to a future time point. For example, the electronic device may obtain predicted velocity information of one eye corresponding to a future time point. For example, the electronic device may use velocity information of one eye to predict a future velocity of the eye.

In operation 236, the electronic device may obtain acceleration information of one eye. For example, the electronic device may obtain acceleration information of one eye by using velocity information of the eye. For example, the electronic device may obtain a change in the velocity of one eye as acceleration information of the eye. For example, the electronic device may use velocity information of one eye to calculate or determine the acceleration of the eye. For example, the electronic device may obtain acceleration information of one eye corresponding to a reference time point.

In operation 238, the electronic device may predict (or, calculate or determine) a future acceleration of one eye. For example, the electronic device may obtain future acceleration information of one eye. For example, the electronic device may predict an acceleration of one eye corresponding to a future time point. For example, the electronic device may obtain predicted acceleration information of one eye corresponding to a future time point. For example, the electronic device may use acceleration information of one eye to predict a future acceleration of the eye.

In operation 240, the electronic device may predict (or, calculate or determine) a future position of one eye. For example, the electronic device may obtain future position information of one eye. For example, the electronic device may predict a position of one eye corresponding to a future time point. For example, the electronic device may obtain predicted position information of one corresponding to a future time point. For example, the electronic device may predict a future position of one eye based on a future acceleration or a future velocity of the eye. For example, the electronic device may use predicted acceleration information or predicted velocity information of one eye to predict a future position of the eye.

The future time point in operation 234 and the future time point in operation 238 may be different time points or may be the same time point. The future time point in operation 234 and the future time point in operation 240 may be different time points or may be the same time point. The future time point in operation 240 and the future time point in operation 238 may be different time points or may be the same time point.

In an embodiment of the disclosure, the electronic device may predict a viewing position of a viewer at a future time point based on a future position of one eye. For example, the electronic device may predict (or, calculate or determine) positions of both eyes of the viewer at a future time point based on future positions of one eye.

In operation 250, the electronic device may render (or generate) an output image by using a prediction result. For example, the electronic device may render an output image based on a viewing position of the viewer at a future time point. For example, the electronic device may generate an output image by rendering an output image based on the future viewing position of the viewer.

In operation 260, the electronic device may display the rendered (or generated) output image. For example, the electronic device may display the rendered (or generated) output image on the display. For example, the electronic device may output the output image through an image output device (or module) that is connected thereto or capable of communication in a wired or wireless manner. For example, the electronic device may output the output image through an image output device (or module) embedded or included therein.

Although FIG. 2 illustrates that the electronic device sequentially performs operations 232 to 240, the disclosure is not limited thereto. For example, the electronic device may perform operation 232 and perform operations 234 and 236 in parallel. For example, the electronic device may perform operation 238 after performing operation 236 regardless of whether operation 234 is performed.

A detailed operation of the electronic device predicting a future viewing position of the viewer may be described below with reference to FIGS. 3 to 14.

Figure 3:
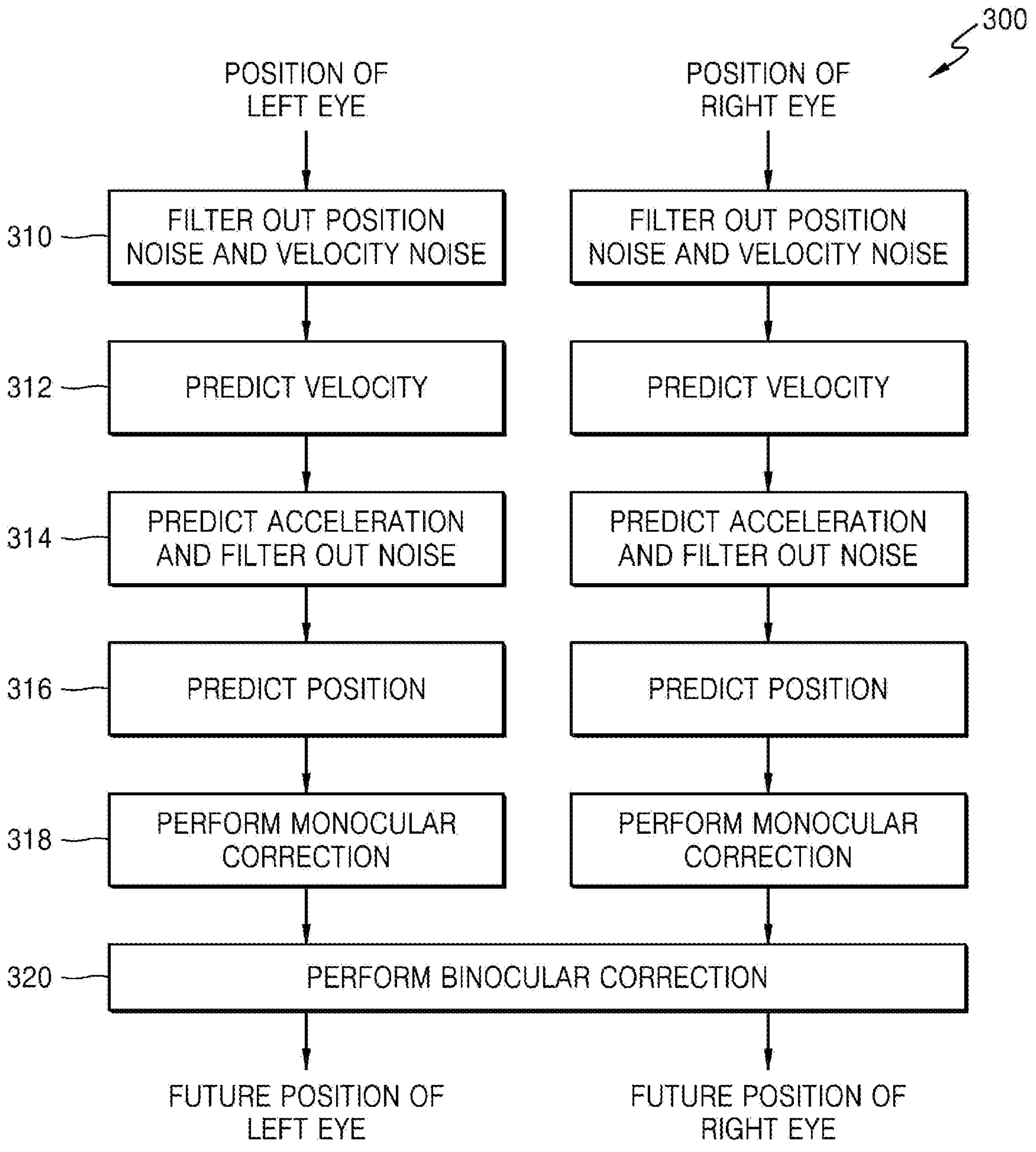
FIG. 3 is a diagram illustrating a method, performed by an electronic device, of predicting a future viewing position of a viewer, according to an embodiment of the disclosure.

FIG. 3 is a diagram illustrating a method, performed by an electronic device, of predicting a future viewing position of a viewer, according to an embodiment of the disclosure.

In describing FIG. 3, redundant descriptions provided above with reference to FIG. 1 or 2 may be omitted.

Referring to FIG. 3, in an embodiment of the disclosure, a method 300, performed by an electronic device, of predicting a viewing position of a viewer may include operations 310 to 320. In an embodiment of the disclosure, an electronic device performing the method 300 may include a display device. In an embodiment of the disclosure, operations 310 to 320 of the method 300 may be performed by at least one processor included in the electronic device. In an embodiment of the disclosure, the electronic device may perform the method 300 in real time. In an embodiment of the disclosure, the electronic device may repeatedly perform the method 300.

In an embodiment of the disclosure, operations 310 to 320 of the method 300 may be performed by a plurality of electronic devices. For example, some operations of the method 300 may be performed by a first electronic device, and other operations may be performed by a second electronic device. The method 300 is not limited to that illustrated in FIG. 3, and in one or more embodiments of the disclosure, the method 300 may further include operations not illustrated in FIG. 3, or some operations may be omitted.

In an embodiment of the disclosure, the electronic device may predict a future viewing position of a viewer based on position information and velocity information of one eye. Referring to FIG. 3, the electronic device may perform the same operation for each of the left and right eyes. Thus, descriptions given below for the left eye with reference to FIG. 3 may be applied to the right eye, and thus, descriptions for the right eye may be omitted.

In operation 310, the electronic device may obtain position information of the left eye, filter out noise from the position information of the left eye, obtain velocity information of the left eye, and filter out noise from the velocity information of the left eye. In an embodiment of the disclosure, the electronic device may determine a filtering degree (or strength) based on the degree of movement of the viewer (e.g., a movement of the left eye) corresponding to a reference time point. For example, based on identifying that the movement of the viewer is large, the electronic device may filter out noise from the position information of the left eye or the velocity information of the left eye, with a weak filtering strength.

In operation 312, the electronic device may predict a future velocity of the left eye. For example, the electronic device may use the velocity information of the left eye to predict (or, calculate or determine) a future velocity of the left eye. For example, the electronic device may use the velocity information of the left eye, from which the noise has been filtered out, to predict a future velocity of the left eye.

In an embodiment of the disclosure, the electronic device may use the velocity information of the left eye, from which the noise has been filtered out, to predict a future velocity of the left eye, by weighted-summing the velocity of the left eye corresponding to a reference time point and the velocity of the left eye corresponding to a past time point. For example, the electronic device may determine a weight based on the degree of movement of the viewer corresponding to a reference time point. For example, based on identifying that a movement of the viewer is large, the electronic device may increase a weight for a velocity corresponding to a reference time point and decrease a weight for a velocity corresponding to a past time point. For example, based on identifying that a movement of the viewer is small, the electronic device may decrease a weight for a velocity corresponding to a reference time point and increase a weight for a velocity corresponding to a past time point.

In operation 314, the electronic device may obtain acceleration information of the left eye, predict a future acceleration of the left eye, and filter out noise from the future acceleration of the left eye. For example, the electronic device may obtain acceleration information of the left eye based on the velocity information of the left eye. For example, the electronic device may obtain acceleration information of the left eye by using the velocity information of the left eye from which the noise has been filtered out.

In an embodiment of the disclosure, the electronic device may obtain nonlinearly predicted acceleration information of the left eye corresponding to a future time point by using the acceleration information of the left eye. The electronic device may predict (or, calculate or determine) a future acceleration of the left eye by filtering out noise from the nonlinearly predicted acceleration information of the left eye. In an embodiment of the disclosure, the electronic device may determine a decrease in the acceleration of the left eye based on a movement state or a movement velocity of the viewer. For example, when the viewer is moving or the velocity of the viewer is greater than or equal to (or greater than) a certain velocity, the electronic device may predict (or, calculate or determine) a future acceleration of the left eye with a small decrease in the acceleration. For example, when the viewer is stationary or the velocity of the viewer is less than (or, greater than or equal to) a certain velocity, the electronic device may predict (or, calculate or determine) a future acceleration of the left eye with a large decrease in the acceleration.

In operation 316, the electronic device may predict a first future position (e.g., a future position before correction) of the left eye based on the predicted future acceleration and future velocity of the left eye. For example, the electronic device may predict the first future position of the left eye based on the future acceleration of the left eye from which the noise has been filtered out. For example, the electronic device may linearly predict a future position of the left eye based on the future velocity of the left eye. For example, the electronic device may nonlinearly predict a future position of the left eye based on the future acceleration of the left eye.

In operation 318, the electronic device may perform monocular correction on the first future position of the left eye. For example, the electronic device may obtain a second future position (e.g., a monocularly corrected future position) of the left eye by correcting the first future position of the left eye. The first future position and the second future position on the left eye may be positions corresponding to the same target time point.

In an embodiment of the disclosure, the electronic device may correct a future position of the left eye corresponding to a target time point based on a future position of the left eye corresponding to a time point prior to the target time point. In an embodiment of the disclosure, the electronic device may adjust a correction strength based on a temporal difference between a reference time point and a future time point (e.g., a target time point). For example, when predicting a relatively near future, i.e., when the difference between the reference time point and the target time point is small, the electronic device may correct the future position of the left eye with a relatively low correction strength. For example, when predicting a relatively distant future, that is, when the difference between the reference time point and the target time point is large, the electronic device may correct the future position of the left eye with a relatively high correction strength.

In operation 320, the electronic device may perform binocular correction based on the second future position of the left eye and the second future position of the right eye. For example, the electronic device may predict (or, calculate or determine) a third future position of the left eye by correcting the second future position of the left eye based on a future position of the center between both eyes. For example, the future position of the center between both eyes may be determined based on the future position of the left eye and the future position of the right eye. For example, the electronic device may correct the second future position of the right eye based on the second future position of the left eye, and correct the second future position of the left eye based on the second future position of the right eye. For example, the electronic device may correct second future position information of the right eye and second future position information of the left eye based on IPD information of the viewer or predefined IPD information.

In an embodiment of the disclosure, the electronic device may correct the future position of the center between both eyes corresponding to the target time point, or the second future position of the left eye corresponding to the target time point, based on a future position of the center between both eyes corresponding to a time point prior to the target time point. In an embodiment of the disclosure, the electronic device may determine a correction strength based on the movement state of the viewer. For example, based on identifying the movement of the viewer as a slow movement, the electronic device may strongly filter the IPD information and use it for binocular correction. For example, based on identifying the movement of the viewer as a fast movement, the electronic device may weakly filter the IPD information and use it for binocular correction.

Although FIG. 3 illustrates that a future position of each of the left and right eyes is a final output of the method 300, the disclosure is not limited thereto. For example, the electronic device may predict (or, calculate or determine) a future position of the center between both eyes as a final output of the method 300.

Although FIG. 3 illustrates that the electronic device performs binocular correction after monocular correction, the disclosure is not limited thereto. For example, the electronic device may perform monocular correction after performing binocular correction.

Detailed operations performed in each operation of FIG. 3 may be described below with reference to FIGS. 4 to 8.

Figure 4:
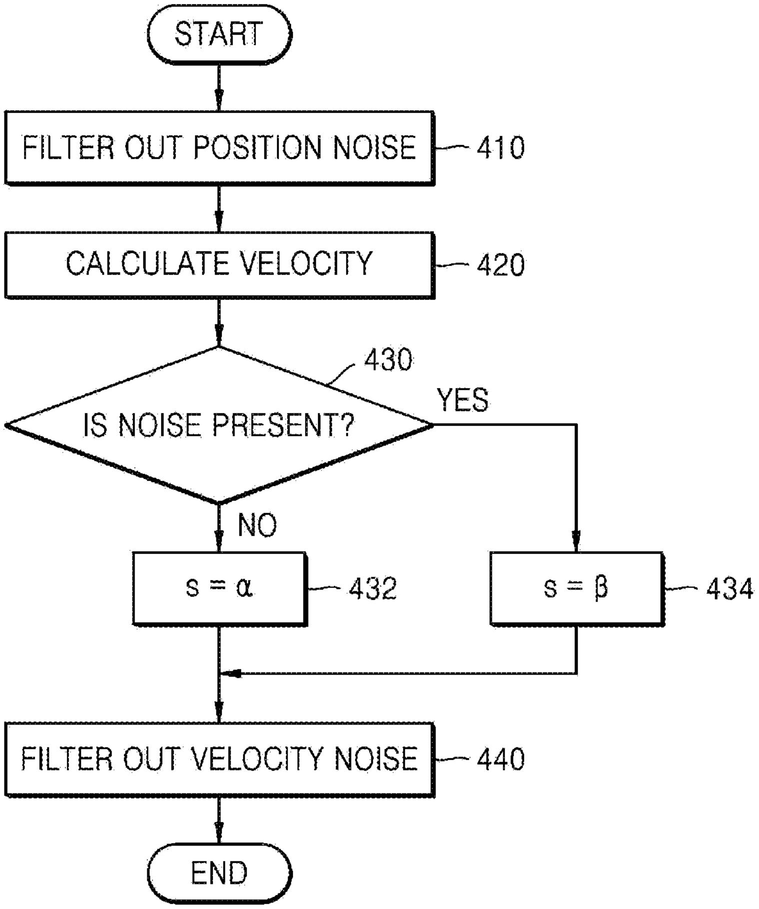
FIG. 4 is a diagram illustrating a method, performed by an electronic device, of filtering out noise from position information and velocity information of a target part included in a viewer's face, according to an embodiment of the disclosure.

FIG. 4 is a diagram illustrating a method, performed by an electronic device, of filtering out noise from position information and velocity information of a target part included in a viewer's face, according to an embodiment of the disclosure.

In describing FIG. 4, redundant descriptions provided above with reference to any one of FIGS. 1 to 3 may be omitted.

In operation 410, the electronic device may obtain position information of a target part and filter out noise from the obtained position information of the target part. For example, the electronic device may filter out noise from the position information of the target part by using Equation 1 below.

$$x_t = \alpha x_t + (1-\alpha)x_{t-1} \quad \text{Equation 1}$$

In Equation 1, $x_t$ may denote a position of the target part corresponding to a time point t (e.g., a reference time point), and $x_{t-1}$ may denote a position of the target part corresponding to a time point t−1 (e.g., a past time point). In Equation 1, $x_t$ on the right side may denote a position of the target part before filtering out noise (e.g., raw position information), and $x_t$ on the left side may denote a position of the target part from which the noise has been filtered out. $x_{t-1}$ on the left side may denote a position of the target part from which the noise has been filtered out. For example, the value of a may be determined based on a filtering strength. For example, the value of a may be determined or set experimentally or empirically.

For example, the electronic device may filter out noise from the position information of the target part by using Equation 2 below.

$$x_t = \alpha x_t + (1-\alpha)\left(x_{t-1} + \overrightarrow{MVx_{t-1}}\right) \quad \text{Equation 2}$$

In Equation 2, $x_t$ may denote a position of the target part corresponding to the time point t (e.g., a reference time point), $x_{t-1}$ may denote a position of the target part corresponding to the time point t−1 (e.g., a past time point), and $\overrightarrow{MVx_{t-1}}$ may denote a velocity of the target part corresponding to the time point t−1. In Equation 2, $x_t$ on the right side may denote a position of the target part before filtering out noise, and $x_t$ on the left side may denote a position of the target part from which the noise has been filtered out. $x_{t-1}$ on the left side may denote a position of the target part from which the noise has been filtered out. For example, the value of a may be determined based on a filtering strength. For example, the value of a may be determined or set experimentally or empirically.

In operation 420, the electronic device may calculate a velocity of the target part based on the position information of the target part. For example, the electronic device may calculate the velocity of the target part by using Equation 3 below.

$$\overrightarrow{MVx_t} = x_t - x_{t-1} \qquad \text{Equation 3}$$

In Equation 3, $x_t$ may denote a position of the target part corresponding to the time point t, and $x_{t-1}$ may denote a position of the target part corresponding to the time point t−1. $\overrightarrow{MVx_t}$ may denote a velocity of the target part corresponding to the time point t.

In operation 430, the electronic device may determine whether noise is present in the velocity information. For example, the electronic device may determine whether noise is present in the velocity information, based on the degree of movement of the viewer. For example, when the degree of movement of the viewer is large, the calculated velocity value may be considered to be due to the movement of the viewer, and thus, it may be determined that no or little noise is present in the velocity information. On the contrary, when the degree of movement of the viewer is small, the calculated velocity value may be considered to be due to noise, and thus, it may be determined that a lot of noise is present in the velocity information.

In an embodiment of the disclosure, the degree of movement of the viewer may be determined based on a velocity corresponding to a reference time point and a velocity corresponding to a past time point. For example, the degree of movement of the viewer may be determined based on the difference between a magnitude $|\overrightarrow{MVx_t}|$ of the velocity corresponding to a reference time point, and a magnitude $|\overrightarrow{MVx_{t-1}}|$ of a velocity corresponding to a past time point (e.g., the amount of change in velocity). For example, when the difference is less than (or, less than or equal to) a threshold value, it may be determined that the degree of movement is small, that is, noise is present (or a lot of noise is present). For example, when the difference is greater than or equal to (or greater than) the threshold value, it may be determined that the degree of movement is large, that is, no noise is present (or little noise is present).

In an embodiment of the disclosure, the electronic device may filter out noise from the velocity information of the target part based on a result of the determination. For example, the electronic device may determine the value of a parameter used for velocity filtering, based on the result of the determination. The value of the parameter used in velocity filtering may be used to determine a weight for a velocity corresponding to a reference time point (e.g., the time point t) in filtering out velocity noise.

Referring to FIG. 4, based on determining that no noise is present (i.e., NO in operation 430), in operation 432, the electronic device may determine a value of a parameter s as a first value α. Based on determining that noise is present (i.e., YES in operation 430), in operation 434, the electronic device may determine the value of the parameter s as a second value β. In operation 440, the electronic device may filter out noise from the velocity information of the target part, based on the value of the parameter determined based on the result of the determination.

For example, the electronic device may filter out noise from the velocity information of the target part by using Equation 4 below.

$$\overrightarrow{MVx_t} = s\overrightarrow{MVx_t} + (1-s)\overrightarrow{MVx_{t-1}} \qquad \text{Equation 4}$$

In Equation 4, $\overrightarrow{MVx_t}$ may denote a velocity of the target part corresponding to the time point t. $\overrightarrow{MV_{x-1}}$ may denote a velocity of the target part corresponding to the time point t−1. s may denote a parameter used for filtering out noise from velocity information. In Equation 4, $\overrightarrow{MYx_t}$ on the right side may denote a velocity of the target part before filtering out noise (e.g., raw velocity information), and $\overrightarrow{MVx_t}$on the left side may denote a velocity of the target part from which the noise has been filtered out. For example, $\overrightarrow{MVx_{t-1}}$ on the left side may denote a velocity of the target part from which the noise has been filtered out.

For example, the electronic device may filter out noise from the velocity information of the target part by using Equation 5 below.

$$\overrightarrow{MVx_t} - s\overrightarrow{MVx_t} + (1-s)\left(\overrightarrow{MVx_{t-1}} + \overrightarrow{MVDx_{t-1}}\right) \qquad \text{Equation 5}$$

In Equation 5, $\overrightarrow{MVx_t}$ may denote a velocity of the target part corresponding to the time point t. $\overrightarrow{MVx_{t-1}}$ may denote a velocity of the target part corresponding to the time point t−1, and $\overrightarrow{MVDx_{t-1}}$ may denote an acceleration of the target part corresponding to the time point t−1. s may denote a parameter used for filtering out noise from velocity information. In Equation 5, on the right side may denote a velocity of the target part before filtering out noise, and $\overrightarrow{MVx_t}$ on the left side may denote a velocity of the target part from which the noise has been filtered out. For example, $\overrightarrow{MVx_{t-1}}$ on the left side may denote a velocity of the target part from which the noise has been filtered out.

For example, based on determining that noise is present, the electronic device may determine the value of s as β. For example, based on determining that no noise is present, the electronic device may determine the value of s as α. α and β may be values determined or set experimentally or empirically. For example, α may be a value greater than β. Accordingly, when it is determined that no or little noise is present, a greater weight may be applied to a velocity corresponding to a reference time point, and when it is determined that noise is present or a lot of noise is present, a greater weight may be applied to a velocity corresponding to a past time point.

Referring to FIG. 4, whether noise is present may include whether the value of the velocity corresponding to the reference time point is due to noise, whether the movement of the viewer is small, whether to apply a high filtering degree to a velocity corresponding to a reference time point, or whether the value of the parameter for the velocity filtering is determined as the second value.

Figure 5:
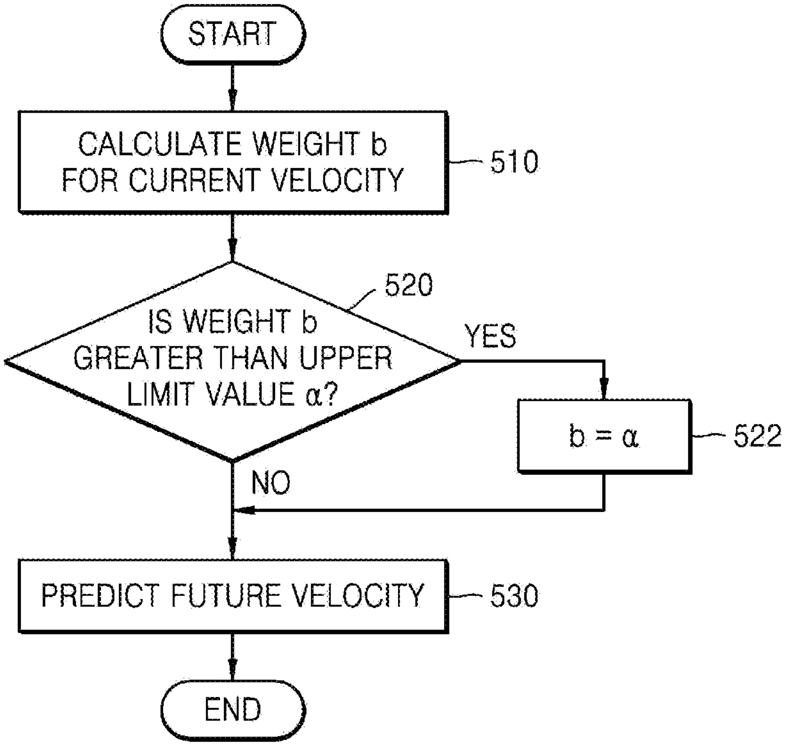
FIG. 5 is a diagram illustrating a method, performed by which an electronic device, of predicting a future velocity of a target part, according to an embodiment of the disclosure.

FIG. 5 is a diagram illustrating a method, performed by which an electronic device, of predicting a future velocity of a target part, according to an embodiment of the disclosure.

Referring to FIG. 5, redundant descriptions provided above with reference to any one of FIGS. 1 to 4 may be omitted.

In an embodiment of the disclosure, the electronic device may predict a future velocity of a target part based on a velocity of the target part corresponding to a reference time point (e.g., a current velocity), and a velocity of the target part corresponding to a past time point (e.g., past velocity information). For example, the electronic device may use a current velocity and the past velocity of the target part, and/or a weight to predict the future velocity of the target part. FIG. 5 illustrates an example in which the electronic device determines a weight for a current velocity of a target part, and predicts a future velocity based on the determined weight, according to an embodiment of the disclosure.

In operation 510, the electronic device may calculate, determine, or obtain a weight for a current velocity of the target part (or a velocity of the target part corresponding to a reference time point). For example, the electronic device may calculate the weight for the current velocity by using Equation 6 below.

$$b = \frac{\left| |\overrightarrow{MVx_{t-1}}| - |\overrightarrow{MVx_t}| \right|}{s} + \beta \quad \text{Equation 6}$$

In Equation 6, $\overrightarrow{MVx_{t-1}}$ may denote a velocity corresponding to the time point t−1 (e.g., a past time point), $\overrightarrow{MVx_t}$ may denote a velocity corresponding to the time point t (e.g., a reference time point or a current time point), and b may denote a weight for the current velocity. s and β are parameter values used to calculate the weight, and may be predetermined or preset. For example, the value of s or β may be determined or set experimentally or empirically.

In operation 520, the electronic device may determine whether the weight for the current velocity is greater than an upper limit value (or, a maximum value or a threshold value). For example, the upper limit value may be a predetermined or preset value. For example, the upper limit value may be determined or set experimentally or empirically. Based on determining that the weight is greater than the upper limit value (i.e., YES in operation 520), in operation 522, the electronic device may determine the weight for the current velocity as the upper limit value.

In operation 530, the electronic device may predict a future velocity of the target part by using the weight for the current velocity. For example, the electronic device may calculate or determine a future velocity of the target part by weighted-summing a current velocity and a past velocity of the target part. For example, based on determining that the weight is not greater than the upper limit value (i.e., NO in operation 520), the electronic device may, in operation 530, predict the future velocity of the target part by using the weight calculated in operation 510. For example, based on determining that the weight is greater than the upper limit value (i.e., YES in operation 520), the electronic device may, in operation 530, predict the future velocity of the target part by using the weight for the current velocity determined in operation 522 (i.e., the upper limit value).

For example, the electronic device may predict the future velocity of the target part by using Equation 7 below.

$$\overrightarrow{MVPx_t} - b\overrightarrow{MVx_t} + (1-b)\overrightarrow{MVx_{t-1}} \quad \text{Equation 7}$$

In Equation 7, MIX, may denote a velocity of the target part corresponding to the time point t (e.g., a reference time point), $\overrightarrow{MVx_{t-1}}$ may denote a velocity of the target part corresponding to the time point t−1 (e.g., a past time point), and b may denote a weight for a velocity of the target part corresponding to the time point t (e.g., a weight for the current velocity). $\overrightarrow{MVPx_t}$ may denote a future velocity of the target part. For example, $\overrightarrow{MVPx_t}$ may denote a future velocity of the target part corresponding to a future time point (e.g., a time point t+1).

Figure 6:
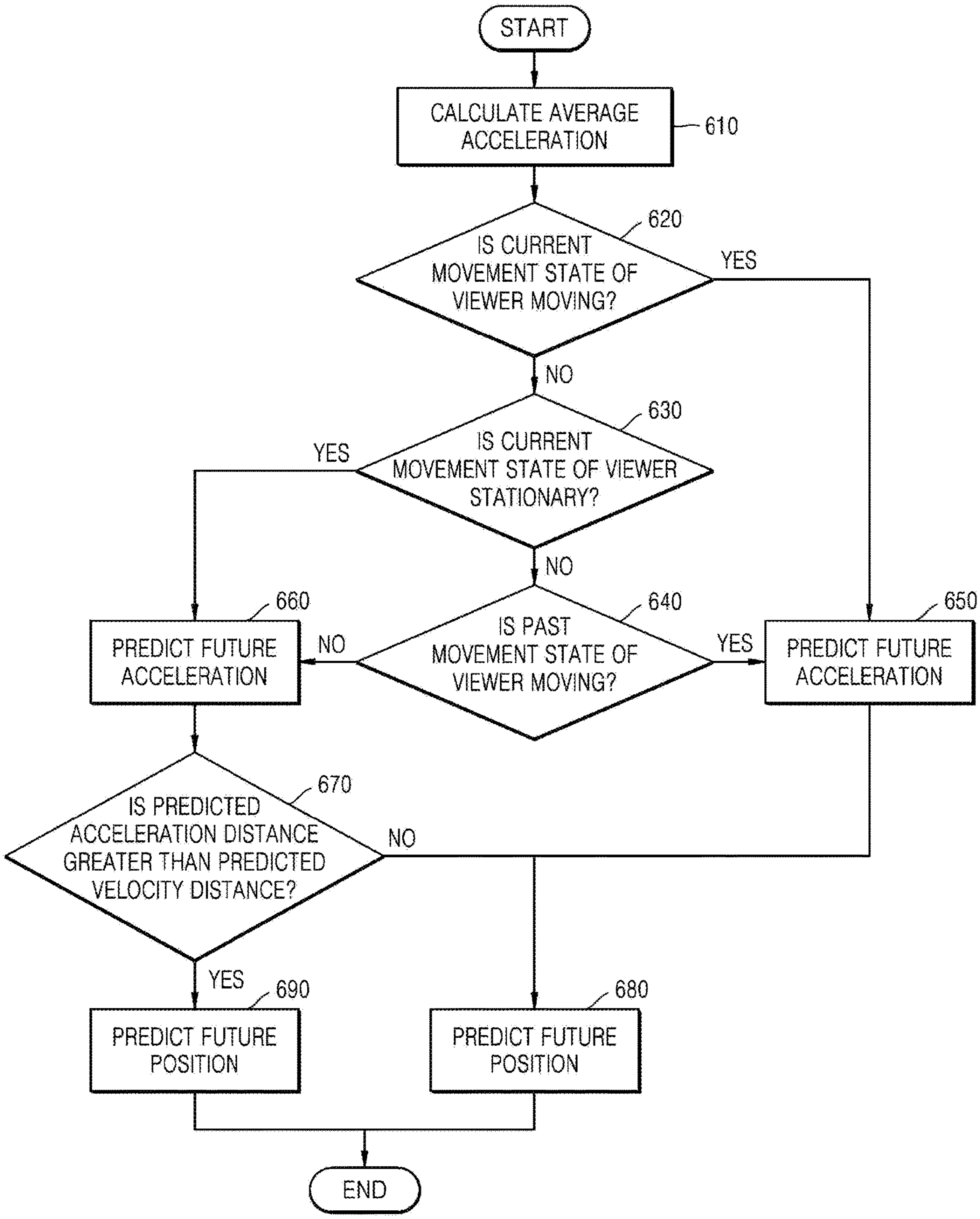
FIG. 6 is a diagram illustrating a method, performed by an electronic device, of predicting a future acceleration of a target part and predicting a future position of the target part, according to an embodiment of the disclosure.

FIG. 6 is a diagram illustrating a method, performed by an electronic device, of predicting a future acceleration of a target part and predicting a future position of the target part, according to an embodiment of the disclosure.

Referring to FIG. 6, redundant descriptions provided above with reference to any one of FIGS. 1 to 5 may be omitted.

In operation 610, the electronic device may calculate (or obtain) an average acceleration of a target part from a particular time point to a reference time point (e.g., a current time point). For example, the electronic device may calculate or determine the average acceleration of the target part based on an acceleration of the target part corresponding to a reference time point (e.g., the time point t), and an acceleration of the target part corresponding to a past time point (e.g., the time point t−1 or t−2). For example, the electronic device may calculate the average acceleration of the target part by using Equation 8 below.

$$m = \frac{\overrightarrow{MVDx_t} + \overrightarrow{MVDx_{t-1}} + \overrightarrow{MVDx_{t-2}}}{3} \quad \text{Equation 8}$$

In Equation 8, $\overrightarrow{MVDx_t}$ may denote an acceleration of the target part corresponding to the time point t, $\overrightarrow{MVDx_{t-1}}$ may denote an acceleration of the target part corresponding to the time point t−1, and $\overrightarrow{MVDx_{t-2}}$ may denote an acceleration of the target part corresponding to the time point t−2. m may denote an average acceleration of the target part.

In operation 620, the electronic device may determine whether the movement state of the viewer corresponding to a reference time point (e.g., the time point t or the current time point) is moving. In an embodiment of the disclosure, the electronic device may determine whether the movement state of the viewer corresponding to the reference time point is moving, by determining whether the viewer's both eyes move in the same direction at the reference time point and/or whether both eyes move at a velocity greater than or equal to (or greater than) a certain velocity. For example, based on determining that the viewer's both eyes are moving in the same direction at the reference time point and the viewer's both eyes are moving at a certain velocity or greater at the reference time point, the electronic device may determine the movement state of the viewer corresponding to the reference time point as moving. For example, when the directions of the velocities of the left and right eyes corresponding to the reference time point are the same, and the magnitudes of the velocities of the left and right eyes corresponding to the reference time point are greater than or equal to (or greater than) a threshold value, the electronic device may determine the movement state of the viewer corresponding to the reference time point as moving.

Based on determining that the movement state of the viewer corresponding to the reference time point is not moving (i.e., NO in operation 620), in operation 630, the electronic device may determine whether the movement state of the viewer corresponding to the reference time point is stationary. In an embodiment of the disclosure, the electronic device may determine whether the movement state of the viewer corresponding to the reference time point is stationary, by determining whether the viewer's both eyes move in the same direction at the reference time point and/or whether both eyes move at a velocity less than (or, less than or equal to) a certain velocity. For example, based on determining that the viewer's both eyes are moving at a velocity less than the certain velocity at the reference time point, the electronic device may determine the movement state of the viewer as stationary. For example, when the magnitudes of the velocities of the left and right eyes corresponding to the reference time point are less than (or, less than or equal to) a threshold value, the electronic device may determine the movement state of the viewer corresponding to the reference time point as stationary.

Based on determining that the movement state of the viewer corresponding to the reference time point is not stationary (i.e., NO in operation 630), in operation 640, the electronic device may determine whether the movement state of the viewer corresponding to a past time point (e.g., the time point t−1) is moving.

In an embodiment of the disclosure, the electronic device may predict a future acceleration of the target part based on a parameter value determined based on the movement state of the viewer, and the average acceleration calculated in operation 610. For example, the electronic device may predict a nonlinearly predicted acceleration of the target part corresponding to the target time point by using the parameter value determined based on the movement state of the viewer, and the average acceleration of the target part. For example, the electronic device may predict the future acceleration of the target part corresponding to the target time point by filtering out noise from the nonlinearly predicted acceleration of the target part corresponding to the target time point. For example, the electronic device may predict a future acceleration of the target part by using Equation 9 below.

$$P(n)_t^n = mr^1 + mr^2 + \ldots + mr^{n-1} \quad \text{Equation 9}$$

$$o(n)_t^n = \gamma P(n)_t^n + (1-\gamma)o(n)_{t-1}^n$$

In Equation 9, m may denote an average acceleration, r may denote a parameter whose value is determined based on the movement state of the viewer, and $$P(n)_t^n$$

may denote a nonlinearly predicted acceleration of the target part corresponding to a time point t+n (e.g., the target time point) that is predicted with the time point t as a reference time point. γ may denote a parameter indicating the filtering degree for acceleration noise. For example, γ may be determined or set experimentally or empirically.

$$o(n)_{t-1}^n$$

may denote a future acceleration of the target part corresponding to a time point t−1+n that is predicted with the time point t−1 as a reference time point. For example, $$o(n)_{t-1}^n$$

may denote a future acceleration of the target part from which noise in an acceleration is filtered out.

$$o(n)_t^n$$

may denote a future acceleration of the target part corresponding to the time point t+n that is predicted with the time point t as a reference time point.

When the movement state of the viewer corresponding to the reference time point is determined as moving (i.e., YES in operation 620), or when the movement state of the viewer corresponding to the past time point is determined as moving (i.e., YES in operation 640), in operation 650, the electronic device may predict a future acceleration of the target part by using a parameter value corresponding to moving. For example, when the movement state of the viewer corresponding to the reference time point is determined as moving (i.e., YES in operation 620), or when the movement state of the viewer corresponding to the past time point is determined as moving (i.e., YES in operation 640), the direction of the future acceleration of the target part $$(\text{e.g., } o(n)_t^n)$$

may be the same as the direction of the future velocity of the target part (e.g., $\overrightarrow{MVPx_t}$).

When the movement state of the viewer corresponding to the reference time point is determined as stationary (i.e., YES in operation 630), or when the movement state of the viewer corresponding to the past time point is determined as stationary (i.e., NO in operation 640), in operation 660, the electronic device may predict a future acceleration by using a parameter value corresponding to stationary. For example, when the movement state of the viewer corresponding to the reference time point is determined as stationary (i.e., YES in operation 630), or when the movement state of the viewer corresponding to the past time point is determined as stationary (i.e., NO in operation 640), the direction of the future acceleration of the target part (e.g., $o(n)_t^n$)

may be different from the direction of the future velocity of the target part (e.g., $\overrightarrow{MVPx_t}$).

For example, the parameter value corresponding to moving may be greater than the parameter value corresponding to stationary. For example, the parameter value corresponding to moving or the parameter value corresponding to stationary may be determined or set experimentally or empirically.

In an embodiment of the disclosure, the electronic device may predict a future position of the target part based on a future acceleration of the target part. For example, the electronic device may obtain, determine, or predict a future position of the target part by using the future acceleration of the target part and the future velocity of the target part.

Referring to FIG. 6, the electronic device may, in operation 650, predict the future acceleration, and then in operation 680, predict the future position of the target part based on the future acceleration and the future velocity of the target part. For example, the electronic device may predict the future position of the target part by using Equation 10 below.

$$x_t^n = r(x_t) + n \times (\overrightarrow{MVPx_t}) + o(n)_t^n \quad \text{Equation 10}$$

In Equation 10, $r(x_t)$ may denote position information of the target part corresponding to the time point t (e.g., the reference time point) from which the noise has been filtered out, n may denote the difference between the target time point (the time point t+n) and the time point t, $\overrightarrow{MVPx_t}$ may denote a future velocity (e.g., a predicted velocity) of the target part corresponding to a future time point (e.g., the time point t+1), $o(n)_t^n$ may denote a future acceleration (e.g., a predicted acceleration) corresponding to the time point t+n that is predicted with the time point t as a reference time point, and $x_t^n$ may denote a future position of the target part corresponding to the time point t+n that is predicted with the time point t as a reference time point.

Referring to FIG. 6, the electronic device may, in operation 660, predict a future acceleration of the target part, and in operation 670, determine whether a predicted acceleration distance of the target part is greater than a predicted velocity distance. The predicted velocity distance may refer to a movement distance (e.g., a position movement distance) predicted by a predicted velocity of the target part (e.g., a future velocity of the target part), and the predicted acceleration distance may refer to a movement distance (e.g., a position movement distance) predicted by a predicted acceleration of the target part (e.g., a future acceleration of the target part). For example, the predicted velocity distance may correspond to the value of $n \times \overrightarrow{MVPx_t}$, and the predicted acceleration distance may correspond to the value of $o(n)_t^n$.

Based on determining that the predicted acceleration distance is not greater than the predicted velocity distance (i.e., NO in operation 670), in operation 680, the electronic device may predict a future position of the target part. For example, based on determining that the predicted acceleration distance is not greater than the predicted velocity distance, the electronic device may predict a future position of the target part by using Equation 10 above.

Based on determining that the movement state of the user is stationary and the predicted acceleration distance is greater than the predicted velocity distance (i.e., YES in operation 670), in operation 690, the electronic device may predict the position of the target part corresponding to the reference time point as the future position of the target part. For example, the electronic device may determine the position of the target part corresponding to the reference time point from which noise in position information is filtered out, as the future position of the target part corresponding to the target time point. For example, when the predicted velocity distance by a future velocity in the positive (+) direction corresponds to n pixels with respect to the position of the target part corresponding to the reference time point (hereinafter, referred to as a 'reference position'), and the predicted acceleration distance by the future acceleration in the negative (−) direction corresponds to n+1 pixels or more, the future position of the target part predicted by using Equation 10 above is in the negative (−) direction from the reference position, and thus, the direction of the future velocity (i.e., the positive (+) direction) and the direction of the future position (i.e., the negative (−) direction) with respect to the reference position may be different from each other. Thus, when the movement state of the user corresponds to stationary and the predicted acceleration distance is greater than the predicted velocity distance, the electronic device may determine the position of the target part corresponding to the reference time point as the future position of the target part.

Although FIG. 6 illustrates that the electronic device determines whether the viewer is moving and then determines whether the viewer is stationary, the disclosure is not limited thereto. For example, the electronic device may determine whether the viewer is stationary, and then determine whether the viewer is moving.

Figure 7:
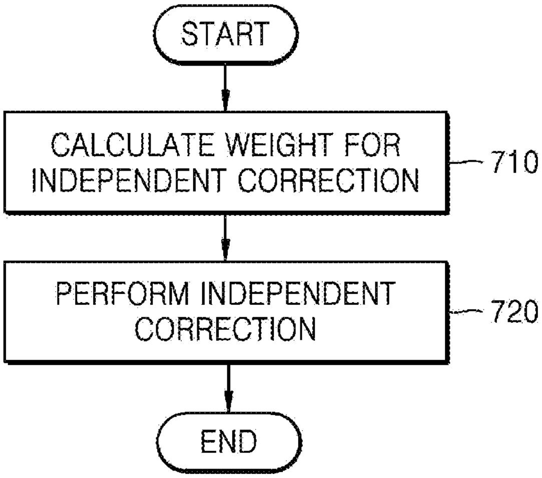
FIG. 7 is a diagram illustrating a method, performed by an electronic device, of performing independent correction on predicted future position information, according to an embodiment of the disclosure.

FIG. 7 is a diagram illustrating a method, performed by an electronic device, of performing independent correction on predicted future position information, according to an embodiment of the disclosure.

Referring to FIG. 7, redundant descriptions provided above with reference to any one of FIGS. 1 to 6 may be omitted.

In operation 710, the electronic device may identify (or, obtain or determine) a weight for independently correcting future position information of a target part. The weight for independent correction may refer to the degree of independent correction or the strength of independent correction. In an embodiment of the disclosure, the value of the weight for independent correction of the target part corresponding to a target time point may be predetermined or preset. In an embodiment of the disclosure, based on the target time point, the electronic device may calculate, determine, or obtain the weight for independent correction of the target part corresponding to the target time point. For example, the electronic device may calculate the weight for independent correction of the target part corresponding to the target time point by using Equation 11 below.

$$w=\min(0.1\,n,\,0.5) \qquad \text{Equation 11}$$

In Equation 11, n may denote the difference between the target time point (e.g., the time point t+n) and the reference time point (e.g., a reference time point or the time point t), and w may denote the weight for independent correction of the target part corresponding to the target time point.

In operation 720, the electronic device may perform independent correction on a future position of the target part by using the weight for independent correction of the target part corresponding to the target time point. For example, the electronic device may perform independent correction on a future position of the target part by using Equation 12 below.

$$x_t^n=(1-w)x_t^n+wx_{t-1}^n \qquad \text{Equation 12}$$

In Equation 12, w may denote the weight for independent correction of the target part corresponding to the target time point, $$x_t^n$$

may denote a future position corresponding to the time point t+n that is predicted with the time point t as a reference time point, and $$x_{t-1}^n$$

may denote a future position corresponding to the time point t−1+n that is predicted with the time point t−1 as a reference time point. In Equation 12, $$x_t^n$$

of the right side may denote a future position of the target part before independent correction, and $$x_t^n$$

of the left side may denote a future position of the target part after independent correction.

Figure 8:
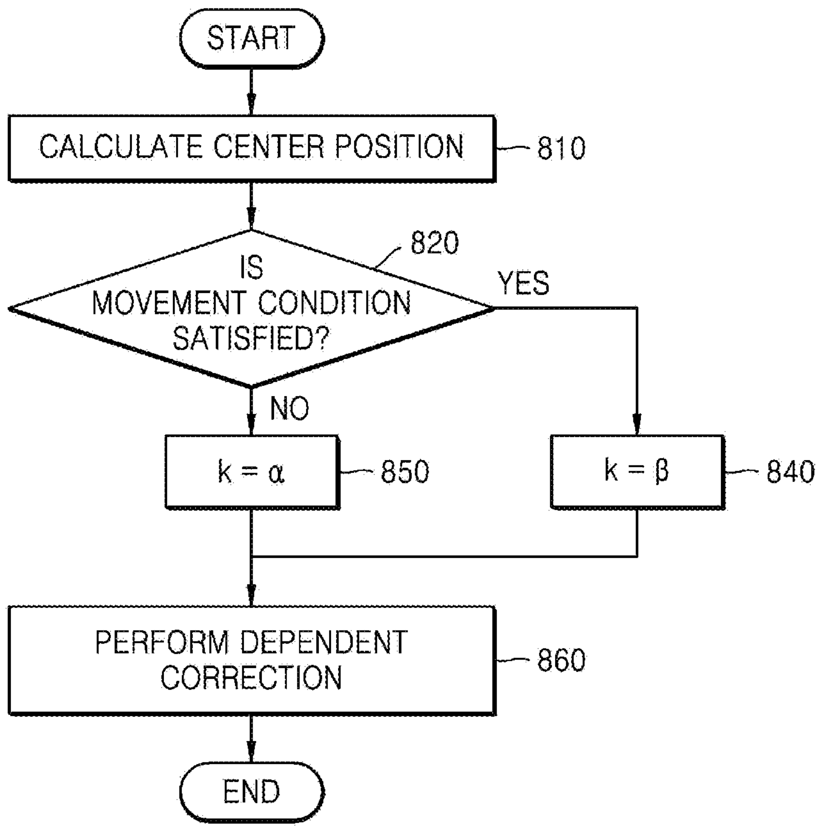
FIG. 8 is a diagram illustrating a method, performed by an electronic device, of performing dependent correction on predicted future position information, according to an embodiment of the disclosure.

FIG. 8 is a diagram illustrating a method, performed by an electronic device, of performing dependent correction on predicted future position information, according to an embodiment of the disclosure.

Referring to FIG. 8, redundant descriptions provided above with reference to any one of FIGS. 1 to 7 may be omitted.

In operation 810, the electronic device may calculate (or, determine or obtain) a center position between a future position of the target part and a future position of another part. For example, the electronic device may calculate, determine, or obtain the position of the center (e.g., the center between both eyes) of a future position of the target part (e.g., the left eye) corresponding to a target time point and a future position of another part (e.g., the right eye) corresponding to the target time point.

In operation 820, the electronic device may determine whether a movement of the viewer satisfies a movement condition. For example, the electronic device may determine whether movements of the target part and another part satisfy the movement condition. For example, based on whether the direction of the velocity of the target part is the same as the direction of the velocity of the other part, and/or whether the magnitude of the velocity of the target part is less than (or, greater than or equal to) a threshold value, the electronic device may determine whether the movement of the viewer satisfies the movement condition. For example, when the direction of the velocity of the target part is the same as the direction of the velocity of the other part, and the magnitude of the velocity of the target part is less than the threshold value, the electronic device may determine that the movement of the viewer satisfies the movement condition. For example, when the direction of the velocity of the target part is different from the direction of the velocity of the other part, or when the magnitude of the velocity of the target part or the magnitude of the velocity of the other part is greater than or equal to the threshold value, the electronic device may determine that the movement of the viewer does not satisfy the movement condition.

In an embodiment of the disclosure, based on determining whether the movement of the viewer satisfies the movement condition, the electronic device may calculate or determine a weight k for dependent correction. The weight k for dependent correction may refer to the degree of dependent correction or the strength of dependent correction.

Referring to FIG. 8, when the movement of the viewer does not satisfy the movement condition (i.e., NO in operation 850), in operation 850, the electronic device may determine the weight k for dependent correction as a first value $\alpha$. When the movement of the viewer satisfies the movement condition (i.e., YES in operation 840), in operation 840, the electronic device may determine the weight k for dependent correction as a second value B. For example, the first value may be greater than the second value.

In operation 860, the electronic device may dependently correct a future position of the target part based on information about the distance between the target part and the other part (e.g., information about the distance between both eyes), and the weight k for dependent correction. In an embodiment of the disclosure, the electronic device may correct a center position between a future position of the target part and a future position of the other part by using the weight for dependent correction. The electronic device may obtain a dependently corrected future position of the target position, and a dependently corrected future position of the other part based on the information about the distance between the target part and the other part, and the corrected center position. For example, the electronic device may dependently correct the future position of the target part and the future position of the other part by using Equation 13 below.

$$EL_{t+n} = (1-k)c_{t+n-1} + kc_{t+n} - d*0.5$$
$$ER_{t+n} = (1-k)c_{t+n-1} + kc_{t+n} + d*0.5 \quad \text{Equation 13}$$

In Equation 13, $c_{t+n}$ may denote a center position between a future position of the target part corresponding to the time point t+n that is predicted with the time point t as a reference time point, and a future position of the other part, $c_{t+n-1}$ may denote a center position of a future position of the target part corresponding to the time point t−1+n that is predicted with the time point t−1 as a reference time point and a future position of the other part, d may denote information about the distance between the target part and the other part, and k may denote a weight for dependent correction. $EL_{t+n}$ may denote a future position of the target part (e.g., the left eye) corresponding to the time point t+n that is predicted with the time point t as a reference time point, that is, a dependently corrected future position, and $ER_{t+n}$ may denote a future position of the other part (e.g., the right eye) corresponding to the time point t+n that is predicted with the time point t as a reference time point, that is, a dependently corrected future position.

For example, the electronic device may dependently correct the future position of the target part and the future position of the other part by using Equation 14 below.

$$EL_{t+n} = c_{t+n} - d*0.5$$
$$ER_{t+n} = c_{t+n} + d*0.5 \quad \text{Equation 14}$$

In Equation 14, $c_{t+n}$ may denote a center position between a future position of the target part corresponding to the time point t+n that is predicted with the time point t as a reference time point, and d may denote information about the distance between the target part and the other part. $EL_{t+n}$ may denote a future position of the target part (e.g., the left eye) corresponding to the time point t+n that is predicted with the time point t as a reference time point, that is, a dependently corrected future position, and $ER_{t+n}$ may denote a future position of the other part (e.g., the right eye) corresponding to the time point t+n that is predicted with the time point t as a reference time point, that is, a dependently corrected future position.

The equations described above with reference to FIGS. 4 to 8 are examples of operations performed in an embodiment of the disclosure, and the disclosure is not limited to the equations described above with reference to FIGS. 4 to 8. In addition, the disclosure is not limited to the operation sequences of the flowcharts illustrated in FIGS. 4 to 8.

Figure 9:
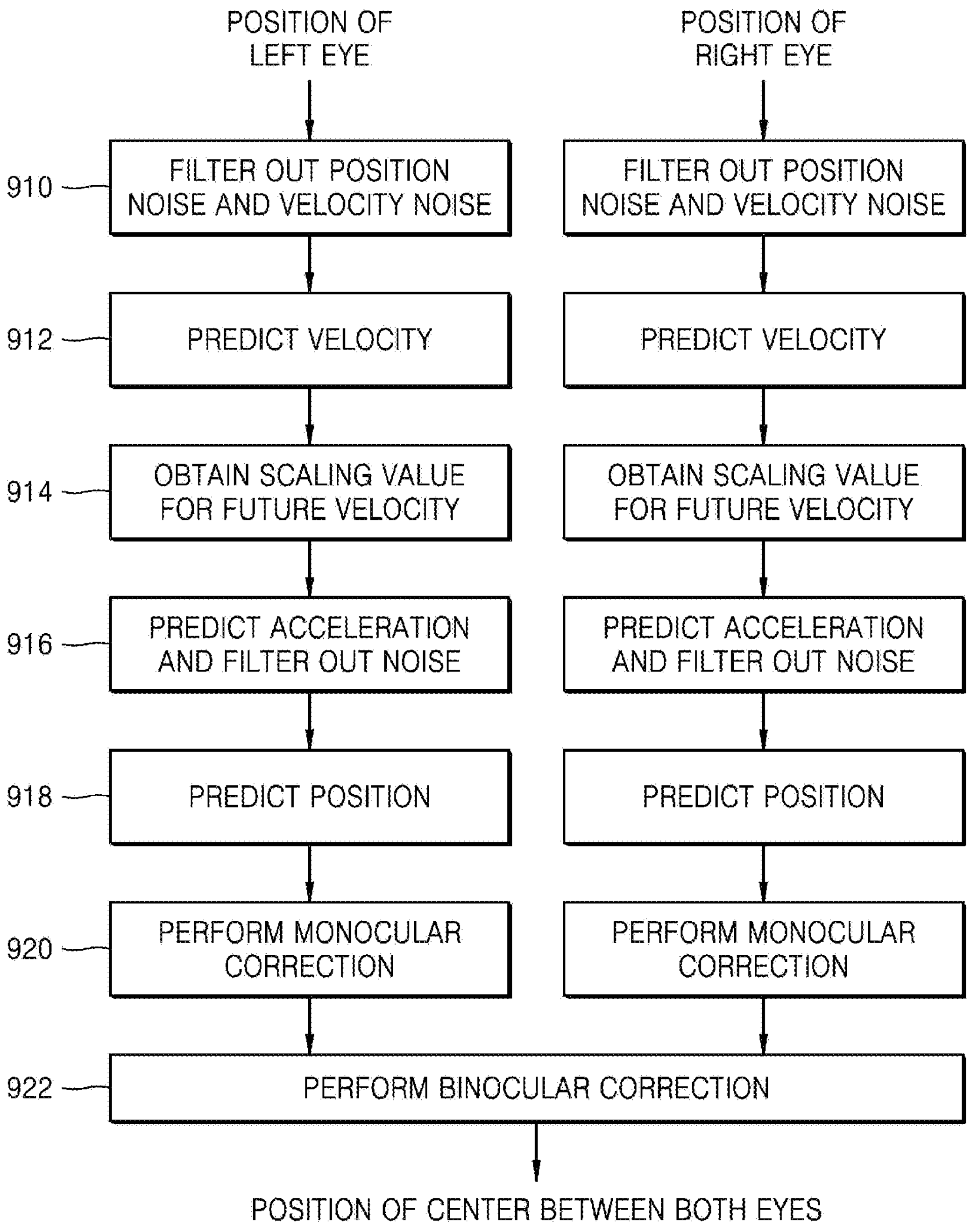
FIG. 9 is a diagram illustrating a method, performed by an electronic device, of predicting a future viewing position of a viewer, according to an embodiment of the disclosure.

FIG. 9 is a diagram illustrating a method, performed by an electronic device, of predicting a future viewing position of a viewer, according to an embodiment of the disclosure.

Referring to FIG. 9, redundant descriptions provided above with reference to any one of FIGS. 1 to 8 may be omitted.

For example, operation 910 of FIG. 9 may correspond to operation 310 of FIG. 3, operation 912 of FIG. 9 may correspond to operation 312 of FIG. 3, operation 916 of FIG. 9 may correspond to operation 314 of FIG. 3, operation 918 of FIG. 9 may correspond to operation 316 of FIG. 3, operation 920 of FIG. 9 may correspond to operation 318 of FIG. 3, and operation 922 of FIG. 9 may correspond to operation 320 of FIG. 3. Thus, redundant descriptions provided above with reference to FIG. 3 may be omitted in describing operations 910, 912, 916, 918, 920, and 922 of FIG. 9. In addition, descriptions given below for the left eye with reference to FIG. 3 may be applied to the right eye, and thus, descriptions for the right eye may be omitted.

In an embodiment of the disclosure, when a position change greater than a threshold value occurs, the electronic device may scale a future velocity of a target part. For example, when a position change greater than the threshold value occurs at a reference time point, the electronic device may scale a future velocity of the target part based on accumulated position information of the target part (or viewing position information of the viewer). For example, based on determining that the viewing position of the viewer (e.g., the position of the target part or the position of the center between both eyes) corresponding to a reference time point is outside a reference region, the electronic device may determine scaling for the future velocity. For example, the reference region may be determined based on accumulated viewing position information of the viewer (e.g., position information of the target part or position information of the center between both eyes) and the distance between both eyes. For example, the reference region may be determined according to Equation 15 below.

$$A_t = A_{t-1}*(K-1) + (\text{position of center between both eyes})/K \quad \text{Equation 15}$$
$$d = A_t \pm C*(\text{distance between both eyes})$$

In Equation 15, $A_{t-1}$ may denote a center position of the reference region corresponding to the time point t−1, K may denote a predetermined or preset parameter value, the position of the center between both eyes may denote the center position between the left eye position and the right eye position corresponding to the time point t, and $A_t$ may denote the center position of the reference region corresponding to the time point t. In Equation 15, C may denote a predetermined or preset parameter value, the distance between both eyes may denote preset or prestored IPD information or the difference between the position of the left eye and the position of the right eye corresponding to the time point t, and d may denote the distance from the center of the reference region to a boundary position of the reference region.

In an embodiment of the disclosure, the electronic device may obtain (or, determine or calculate) a scaling value for the future velocity of the target part. For example, referring to FIG. 9, in operation 914, the electronic device may obtain a scaling value for a future velocity of the left eye. In an embodiment of the disclosure, when the direction of the future velocity of the target part (e.g., the left eye) is toward the outside of the reference region (or is an outward direction), the electronic device may determine a value less than or equal to 1 as the scaling value for the future velocity of the target part. For example, the electronic device may determine a scaling value for a future velocity of less than or equal to 1 by using Equation 16 below.

$$\text{Scaling value} = (A_t \pm C*(\text{distance between both eyes}))/\text{position of center between both eyes} \quad \text{Equation 16}$$

In Equation 16, the position of the center between both eyes may denote the center position between the left eye position and the right eye position corresponding to the time point t, $A_t$ may denote the center position of the reference region corresponding to the time point t, C may denote a predetermined or preset parameter value, and the distance between both eyes may denote preset or prestored IPD information or the difference between the left eye position and the right eye position corresponding to the time point t.

In an embodiment of the disclosure, when the direction of the future velocity of the target part (e.g., the left eye) is toward the center of the reference region, the electronic device may determine a value greater than or equal to 1 as the scaling value for the future velocity. For example, the electronic device may determine a scaling value for a future velocity of greater than or equal to 1 by using Equation 17 below.

$$\text{Scaling value} = \text{poision of center between both eyes}/(A_t \pm C^{*}(\text{distance between both eyes})) \quad \text{Equation 17}$$

In Equation 17, the position of the center between both eyes may denote the center position between the left eye position and the right eye position corresponding to the time point t, $A_t$ may denote the center position of the reference region corresponding to the time point t, C may denote a predetermined or preset parameter value, and the distance between both eyes may denote preset or prestored IPD information or the difference between the left eye position and the right eye position corresponding to the time point t.

In an embodiment of the disclosure, the electronic device may predict a future acceleration of a target part based on the movement state of the viewer. The movement state of the viewer, which serves as the basis for predicting the future acceleration of the target part, may be associated with a scaling value for the future velocity of the target part. For example, a scaling value for a future velocity of less than or equal to (or less than) 1 may correspond to stationary, and a scaling value for a future velocity of greater than or equal to (or greater than) 1 may correspond to moving. For example, when the direction of the future velocity of the target part is toward the outside of the reference region (or is an outward direction), the movement state of the viewer may be determined as stationary, and when the direction of the future velocity of the target part is toward the center of the reference region, the movement state of the viewer may be determined as moving.

In operation 916, the electronic device may predict a future acceleration of the left eye based on the movement state of the viewer. For example, when the scaling value for the future velocity obtained in operation 914 is less than or equal to (or less than) 1, the electronic device may determine the movement state of the viewer as stationary, and predict (or, determine or obtain) the future acceleration of the left eye. For example, when the scaling value for the future velocity obtained in operation 914 is greater than or equal to (or greater than) 1, the electronic device may determine the movement state of the viewer as moving, and predict (or determine) the future acceleration of the left eye.

In operation 918, the electronic device may predict the future position of the left eye based on the scaling value for the future velocity, the future velocity of the left eye, and the future acceleration of the left eye. For example, the electronic device may predict the future position of the left eye by using Equation 18 below.

$$x_t^n = r(x_t) + n \times g(x_t)(\overrightarrow{MVPx_t}) + o(n)_t^n \quad \text{Equation 18}$$

In Equation 18, $r(x_t)$ may denote position information of the target part corresponding to the time point t (e.g., a reference time point) from which the noise has been filtered out, n may denote the difference between the target time point (e.g., the time point t+n) and the reference time point (e.g., the time point t), $g(x_t)$ may denote a scaling function for the future velocity of the target part, $\overrightarrow{MVPx_t}$ may denote a future velocity (e.g., a predicted velocity) of the target part corresponding to a future time point (e.g., the time point t+1), and $$o(n)_t^n$$

may denote a future acceleration (e.g., a predicted acceleration) of the target part corresponding to the time point t+n that is predicted with the time point t as a reference time point.

Although FIG. 9 illustrates an example in which the electronic device obtains a future position of the center between both eyes by performing binocular correction, the disclosure is not limited thereto. For example, as illustrated in FIG. 3, the electronic device may obtain future positions of the left and right eyes by performing binocular correction. For example, the electronic device may obtain a future position of the center between both eyes by performing binocular correction, and obtain (or, determine or calculate) a future position of the left eye and/or the right eye by using the future position of the center between both eyes and IPD information.

Figure 10:
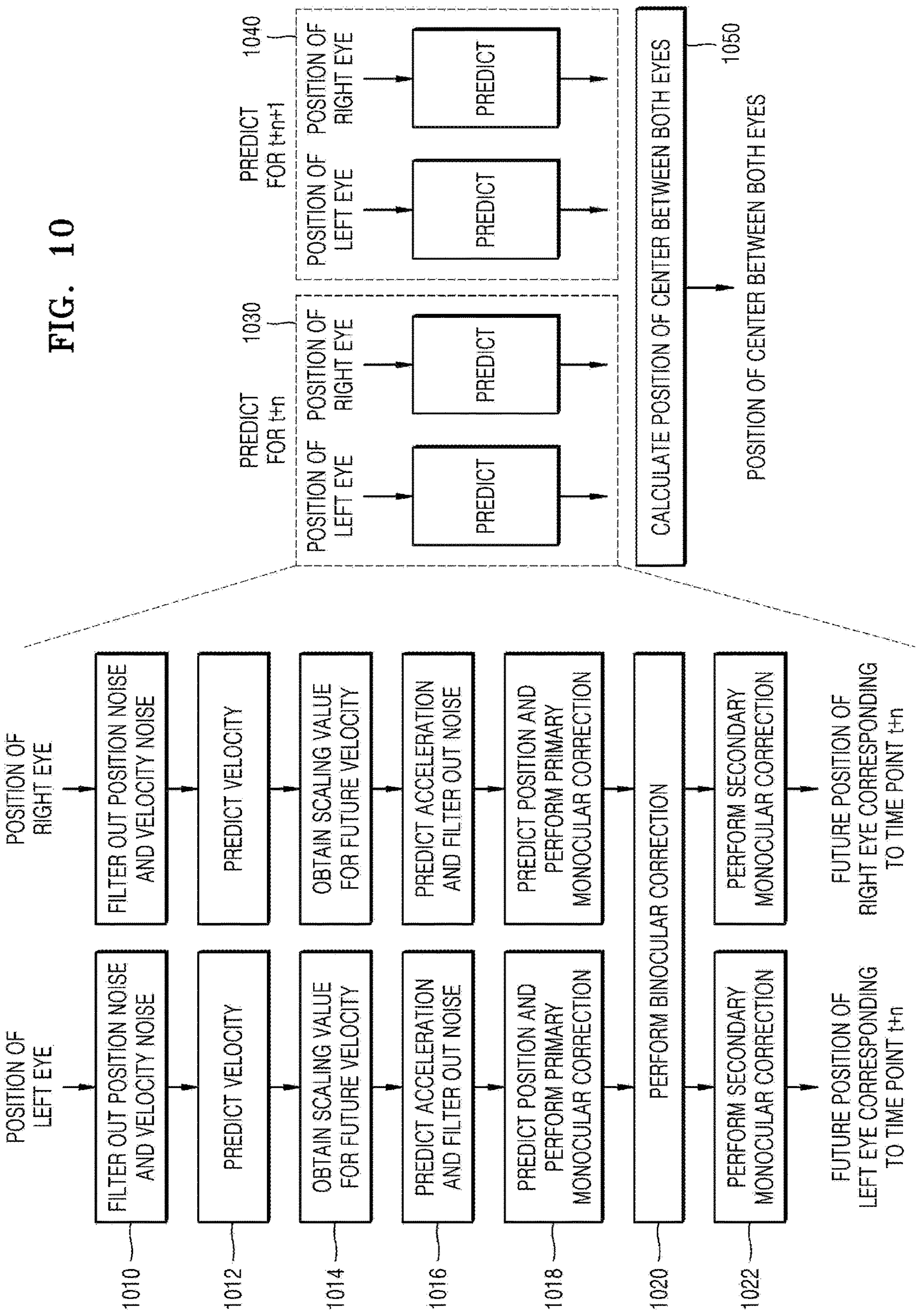
FIG. 10 is a diagram illustrating a method, performed by an electronic device, of predicting a future viewing position of a viewer, according to an embodiment of the disclosure.

FIG. 10 is a diagram illustrating a method, performed by an electronic device, of predicting a future viewing position of a viewer, according to an embodiment of the disclosure.

FIG. 10 may illustrate an example in which an electronic device predicts a future viewing position of a viewer by using a prediction result corresponding to a time point t+n and a prediction result corresponding to a time point t+n+1, according to an embodiment of the disclosure.

Referring to FIG. 10, redundant descriptions provided above with reference to any one of FIGS. 1 to 9 may be omitted. For example, operation 1010 of FIG. 10 may correspond to operation 910 of FIG. 9, operation 1012 of FIG. 10 may correspond to operation 912 of FIG. 9, operation 1014 of FIG. 10 may correspond to operation 914 of FIG. 9, operation 1016 of FIG. 10 may correspond to operation 916 of FIG. 9, operation 1018 of FIG. 10 may correspond to operations 918 and 920 of FIG. 9, and operation 1020 of FIG. 10 may correspond to operation 922 of FIG. 9. Thus, redundant descriptions provided above with reference to FIG. 3 or 9 may be omitted in describing operations 1010 to 1022 of FIG. 10.

In an embodiment of the disclosure, the electronic device may perform monocular correction on a dependently corrected future position of a target part. Referring to FIG. 10, in operation 1022, the electronic device may perform secondary monocular correction on a binocularly corrected future position of the left eye. For example, the electronic device may perform secondary monocular correction on the binocularly corrected future position of the left eye by using a weight that is equal to or different from that of primary monocular correction of operation 1018.

In an embodiment of the disclosure, to improve the accuracy of prediction of a future viewing position of a viewer with respect to (or at) a target time point, the electronic device may use a prediction result 1030 corresponding to the target time point, and a prediction result 1040 corresponding to a time point subsequent to the target time point (e.g., a next time point). For example, the electronic device may predict the future viewing position of the viewer (e.g., future positions of both eyes) with respect to the target time point, based on a future position of the target part corresponding to the target time point and a future position of the target part corresponding to a time point subsequent to the target time point. For example, the electronic device may perform the operations that have been performed for the target time point to obtain the prediction result 1030 corresponding to the target time point, also for a time point subsequent to the target time point sequentially, in parallel, or independently, to obtain the prediction result 1040 corresponding to the time point subsequent to the target time point.

The prediction result 1030 corresponding to the target time point may include a future position of the target part corresponding to the target time point. The prediction result 1040 corresponding to the time point subsequent to the target time point may include a future position of the target part corresponding to the time point subsequent to the target time point. As illustrated in FIG. 10, the prediction result 1030 corresponding to the target time point (the time point t+n) may include a future position of the left eye corresponding to the target time point and a future position of the right eye corresponding to the target time point. Similarly, the prediction result 1040 corresponding to the time point t+n+1 subsequent to the target time point may include a future position of the left eye corresponding to the time point subsequent to the target time point and a future position of the right eye corresponding to the time point subsequent to the target time point.

Referring to FIG. 10, the electronic device may predict future positions of the left and right eyes with the time point t+n as a first target time point, and predict future positions of the left and right eyes with the time point t+n+1 as a second target time point. The electronic device may calculate (or, determine or obtain) a future viewing position of the viewer with respect to the first target time point, based on the future positions of the left eye and the right eye corresponding to the first target time point and the future positions of the left eye and the right eye corresponding to the second target time point. For example, the electronic device may calculate the average (or weighted average) position of the future positions of the left and right eyes corresponding to the first target time point, and the future positions of the left and right eyes corresponding to the second target time point, as a future position of the center between both eyes with respect to the first target time point (1050). The electronic device may determine the positions of both eyes with respect to the first target time point as future viewing positions of the viewer, based on a position of the center between both eyes with respect to the first target time point, and IPD information (e.g., IPD information of the viewer).

Figure 11:
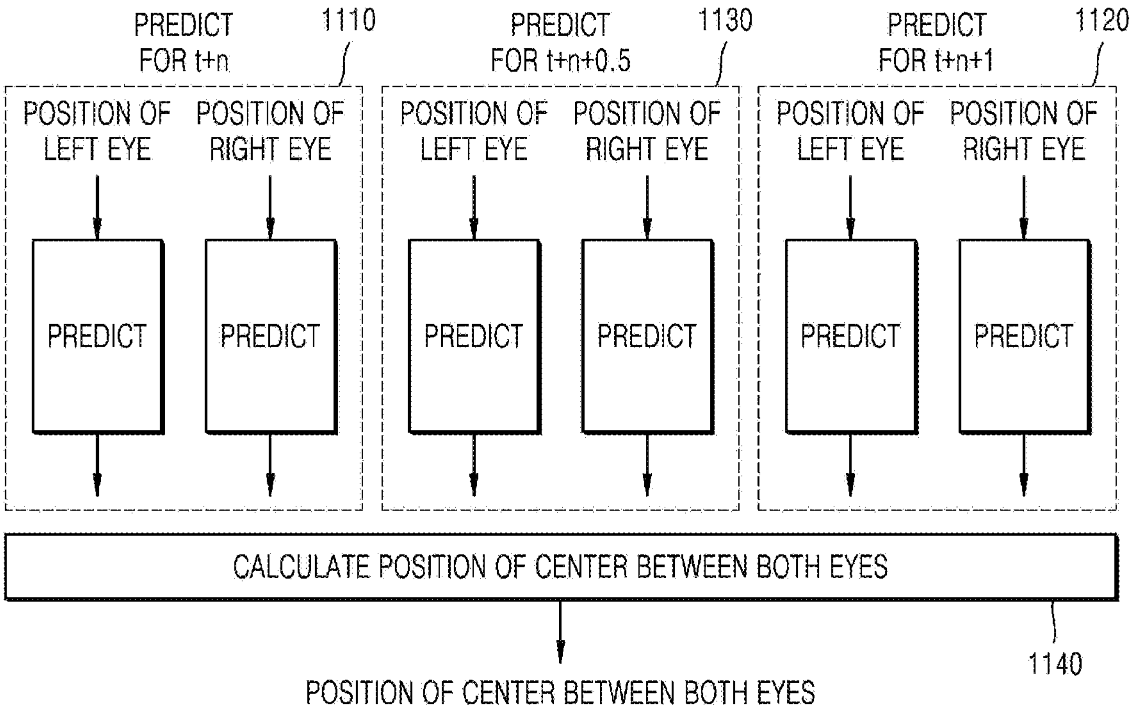
FIG. 11 is a diagram illustrating a method, performed by an electronic device, of predicting a future viewing position of a viewer, according to an embodiment of the disclosure.

FIG. 11 is a diagram illustrating a method, performed by an electronic device, of predicting a future viewing position of a viewer, according to an embodiment of the disclosure.

FIG. 11 is a diagram illustrating an electronic device predicting a future viewing position of a viewer by using a prediction result corresponding to a time point t+n, a future viewing position of a viewer by using a prediction result corresponding to a time point t+n+0.5, and a prediction result corresponding to a time point t+n+1, according to an embodiment of the disclosure.

Referring to FIG. 11, redundant descriptions provided above with reference to any one of FIGS. 1 to 10 may be omitted. For example, 1110 of FIG. 11 may correspond to 1030 of FIG. 10, 1120 of FIG. 11 may correspond to 1040 of FIG. 10, and 1140 of FIG. 11 may correspond to 1050 of FIG. 10.

In an embodiment of the disclosure, to improve the accuracy of prediction of a future viewing position of the viewer with respect to (or at) a target time point, the electronic device may use a prediction result 1110 corresponding to the target time point, a prediction result 1120 corresponding to a time point subsequent to the target time point (e.g., a next time point), and a prediction result 1130 corresponding to an intermediate time point between the target time point and the time point subsequent to the target time point. For example, the electronic device may predict the future viewing position of the viewer (e.g., future positions of both eyes) with respect to the target time point, based on a future position of the target part corresponding to the target time point, a future position of the target part corresponding to the time point subsequent to the target time point, and a future position of the target part corresponding to the intermediate time point.

The prediction result 1110 corresponding to the target time point may include a future position of the target part corresponding to the target time point. The prediction result 1120 corresponding to the time point subsequent to the target time point may include a future position of the target part corresponding to the time point subsequent to the target time point. The prediction result 1130 corresponding to the intermediate time point may include a future position of the target part corresponding to the intermediate time point. As illustrated in FIG. 11, the prediction result 1110 corresponding to the target time point (the time point t+n) may include a future position of the left eye corresponding to the target time point and a future position of the right eye corresponding to the target time point. Similarly, the prediction result 1120 corresponding to the time point t+n+1 subsequent to the target time point may include a future position of the left eye corresponding to the time point subsequent to the target time point and a future position of the right eye corresponding to the time point subsequent to the target time point. Similarly, the prediction result 1130 corresponding to the intermediate time point t+n+0.5 may include a future position of the left eye corresponding to the intermediate time point and a future position of the right eye corresponding to the intermediate time point.

In an embodiment of the disclosure, the electronic device may obtain the prediction result 1130 corresponding to the intermediate time point by performing at least some of the operations that have been performed for the target time point, also for the intermediate time point sequentially, in parallel, or independently. In an embodiment of the disclosure, the electronic device may obtain the prediction result 1130 corresponding to the intermediate time point by performing, for the intermediate time point, an operation that is partially different from the operation that has been performed for the target time point. For example, in order to obtain the prediction result 1130 corresponding to the intermediate time point, the electronic device may obtain (or calculate) a future acceleration of the target part (e.g., the left eye and the right eye) corresponding to the intermediate time point by using Equation 19 below.

$$P(n+0.5)_t^{n+0.5} = inp\begin{pmatrix} mr^1 + mr^2 + \ldots + mr^{n-2} \\ mr^1 + mr^2 + \ldots + mr^{n-1} \\ mr^1 + mr^2 + \ldots + mr^{n} \\ mr^1 + mr^2 + \ldots + mr^{n+1} \end{pmatrix} \quad \text{Equation 19}$$

$$o(n+0.5)_t^{n+0.5} = \gamma P(n+0.5)_t^{n+0.5} + (1-\gamma)o(n+0.5)_{t-1}^{n+0.5}$$

In Equation 19, m may denote an average acceleration, r may denote a parameter whose value is determined based on the movement state of the viewer, and $$P(n+0.5)_t^{n+0.5}$$

may denote a nonlinearly predicted acceleration of the target part corresponding to a time point t+n+0.5 (e.g., the intermediate time point) that is predicted with the time point t as a reference time point. γ may denote the filtering degree for acceleration noise. For example, γ may be determined or set experimentally or empirically.

$$o(n+0.5)_{t-1}^{n+0.5}$$

may denote a future acceleration of the target part corresponding to the time point t−1+n+0.5 that is predicted with the time point t−1 as a reference time point. For example, $$o(n+0.5)_{t-1}^{n+0.5}$$

may denote a future acceleration of the target part from which noise in an acceleration is filtered out.

$$o(n+0.5)_t^{n+0.5}$$

may denote a future acceleration of the target part corresponding to the time point t+n+0.5 that is predicted with the time point t as a reference time point, which is obtained by filtering out noise from the nonlinearly predicted acceleration of the target part corresponding to the time point t+n+0.5 that is predicted with the time point t as a reference time point. inp(·) may represent an interpolation function.

Referring to FIG. 11, the electronic device may predict future positions of the left and right eyes with the time point t+n as a first target time point, predict future positions of the left and right eyes with the time point t+n+1 as a second target time point, and predict future positions of the left and right eyes with the time point t+n+0.5 as a third target time point. The electronic device may calculate (or, determine or obtain) a future viewing position of the viewer with respect to the first target time point, based on the future positions of the left eye and the right eye corresponding to the first target time point, the future positions of the left eye and the right eye corresponding to the second target time point, and the future positions of the left eye and the right eye corresponding to the third target time point. For example, the electronic device may calculate the average (or weighted average) position of the future positions of the left and right eyes corresponding to the first target time point, the future positions of the left and right eyes corresponding to the second target time point, and the average (or weighted average) position of the future positions of the left and right eyes corresponding to the third target time point, as a future position of the center between both eyes with respect to the first target time point (1140). The electronic device may determine, as future viewing positions of the viewer, the positions of both eyes with respect to the first target time point, which are obtained based on a position of the center between both eyes with respect to the first target time point, and IPD information.

Figure 12:
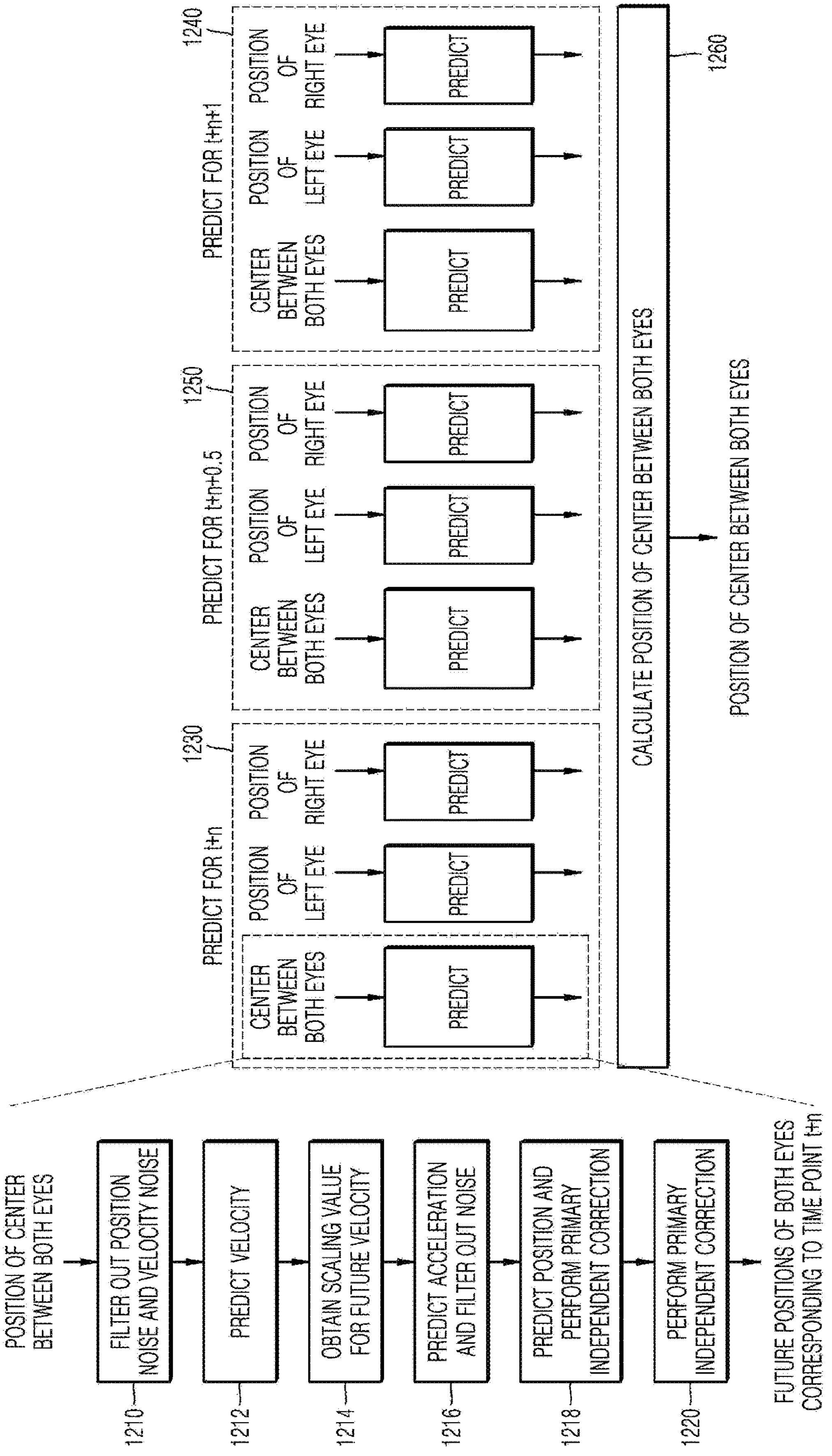
FIG. 12 is a diagram illustrating a method, performed by an electronic device, of predicting a future viewing position of a viewer, according to an embodiment of the disclosure.

FIG. 12 is a diagram illustrating a method, performed by an electronic device, of predicting a future viewing position of a viewer, according to an embodiment of the disclosure.

Referring to FIG. 12, redundant descriptions provided above with reference to any one of FIGS. 1 to 11 may be omitted.

FIG. 12 illustrates an example of predicting a future position of the center between both eyes by using the center between both eyes as a target part, and predicting a future viewing position of a viewer based on the predicted future position of the center between both eyes, according to an embodiment of the disclosure. Operations 1210 to 1220 of FIG. 12 may correspond to operations 1010 to 1022 of FIG. 10. For example, at least some of the operations performed by the electronic device with respect to the left eye in the above descriptions of FIG. 3, 9, or 10 may be performed by the electronic device with respect to the center between both eyes in operations 1210 to 1220 of FIG. 12. For example, as illustrated in FIG. 12, the electronic device may not perform dependent correction (e.g., binocular correction) on the center between both eyes unlike the left or right eye, but the disclosure is not limited thereto.

In an embodiment of the disclosure, to improve the accuracy of prediction of a future viewing position of the viewer with respect to (or at) the target time point, the electronic device may use a prediction result 1230 corresponding to the target time point, a prediction result 1240 corresponding to a time point subsequent to the target time point (e.g., a next time point), and a prediction result 1250 corresponding to an intermediate time point between the target time point and the time point subsequent to the target time point. For example, the electronic device may predict the future viewing position of the viewer (e.g., future positions of both eyes) with respect to the target time point, based on a future position of the target part corresponding to the target time point, a future position of the target part corresponding to the time point subsequent to the target time point, and a future position of the target part corresponding to the intermediate time point.

The prediction result 1230 corresponding to the target time point may include a future position of the target part corresponding to the target time point. The prediction result 1240 corresponding to the time point subsequent to the target time point may include a future position of the target part corresponding to the time point subsequent to the target time point. The prediction result 1250 corresponding to the intermediate time point may include a future position of the target part corresponding to the intermediate time point. As illustrated in FIG. 12, the prediction result 1230 corresponding to the target time point may include a future position of the left eye, a future position of the right eye, and a future position of the center between both eyes corresponding to the target time point. The prediction result 1240 corresponding to the time point subsequent to the target time point may include a future position of the left eye, a future position of the right eye, and a future position of the center between both eyes corresponding to the time point subsequent to the target time point. The prediction result 1250 corresponding to the intermediate time point may include a future position of the left eye, a future position of the right eye, and a future position of the center between both eyes corresponding to the intermediate time point.

Referring to FIG. 12, the electronic device may predict a future position of each of the left eye, the right eye, and the center between both eyes by using the time point t+n as a first target time point, predict a future position of each of the left eye, the right eye, and the center between both eyes by using the time point t+n+1 as a second target time point, and predict a future position of each of the left eye, the right eye, and the center between both eyes by using the time point t+n+0.5 as a third target time point. The electronic device may calculate (or, determine or obtain) a future viewing position of the viewer with respect to the first target time point, based on the future position of the left eye corresponding to the first target time point, the future position of the right eye corresponding to the first target time point, the future position of the center between both eyes corresponding to the first target time point, the future position of the left eye corresponding to the second target time point, the future position of the right eye corresponding to the second target time point, the future position of the center between both eyes corresponding to the second target time point, the future position of the left eye corresponding to the third target time point, the future position of the right eye corresponding to the third target time point, and the future position of the center between both eyes corresponding to the third target time point. For example, the electronic device may calculate, as a future position of the center between both eyes with respect to the first target time point, the average (or weighted average) position of the future position of the left eye corresponding to the first target time point, the future position of the right eye corresponding to the first target time point, the future position of the center between both eyes corresponding to the first target time point, the future position of the left eye corresponding to the second target time point, the future position of the right eye corresponding to the second target time point, the future position of the center between both eyes corresponding to the second target time point, the future position of the left eye corresponding to the third target time point, the future position of the right eye corresponding to the third target time point, and the future position of the center between both eyes corresponding to the third target time point (1260). The electronic device may determine, as future viewing positions of the viewer, the positions of both eyes with respect to the first target time point, which are obtained based on a position of the center between both eyes with respect to the first target time point, and IPD information.

Figure 13:
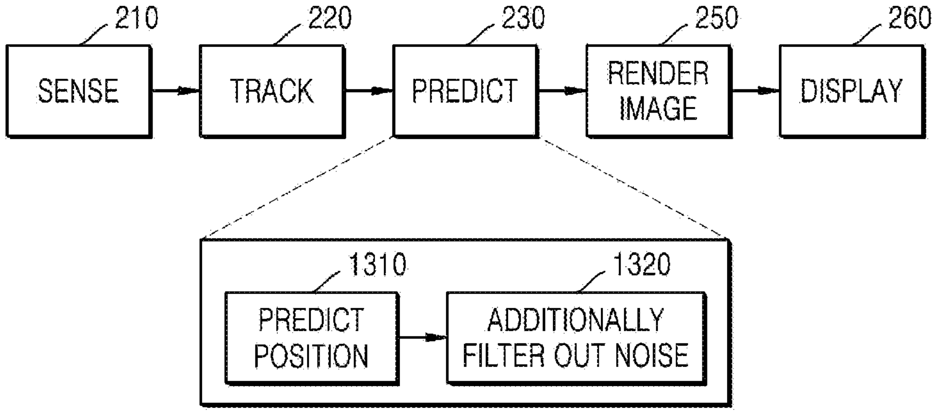
FIG. 13 is a diagram illustrating an electronic device additionally filtering out noise from future viewing position information of a viewer according to an embodiment of the disclosure.

FIG. 13 is a diagram illustrating an electronic device additionally filtering out noise from future viewing position information of a viewer, according to an embodiment of the disclosure.

Referring to FIG. 13, redundant descriptions provided above with reference to any one of FIGS. 1 to 12 may be omitted.

In an embodiment of the disclosure, before rendering (250) an output image by using future viewing position information of the viewer that is predicted with respect to a target time point, the electronic device may additionally filter out noise from the future viewing position information of the viewer. For example, in order to remove noise that may occur when predicting a distant future (e.g., a future after more than n frames, where n is a natural number), the electronic device may additionally filter out noise before rendering the output image. For example, the electronic device may additionally filter out noise from final prediction information (e.g., a future viewing position of the viewer) obtained by one or more embodiments described above with respect to any one of FIGS. 2 to 12. For example, the electronic device may additionally filter out noise from a future position of the target part corresponding to (or with respect to) the target time point, a future position of the center between both eyes corresponding to (or with respect to) the target time point, or future positions of both eyes corresponding to (or with respect to) the target time point.

For example, the electronic device may additionally filter out noise from predicted future viewing position information of the viewer with respect to the target time point by using Equation 20 below.

$$s_t - \alpha x_t + (1-\alpha)(s_{t-1} + b_{t-1})$$
$$b_t = \beta(s_t - s_{t-1}) + (1-\beta)(b_{t-1} + k_{t-1})$$
$$kt = \gamma(b_t - b_{t-1}) + (1-\gamma)k_{t-1}$$

Equation 20

In Equation 20, $x_t$ may denote a future viewing position of the viewer that is predicted with respect to the target time point (e.g., future positions of both eyes or a future position of the center between both eyes). The values of $s_0$, $b_0$, and $k_0$ may be predetermined or preset. The values of α, β, and γ may be predetermined or preset.

Referring to FIG. 13, in operation 1310, the electronic device may predict a future viewing position of the viewer with respect to (or at) the target time point, and in operation 1320, the electronic device may additionally filter out noise from a result of the prediction. For example, a prediction result from which the noise is filtered out in operation 1320 may include at least one of a future viewing position of the viewer, a future position of the left eye corresponding to (or, with respect to or at) the target time point, a future position of the right eye corresponding to (or, with respect to or at) the target time point, a future position of the center between both eyes corresponding to (or, with respect to or at) the target time point, or a future position of the target part corresponding to (or, with respect to or at) the target time point, which is predicted by one or more embodiments described above with respect to at least one of FIGS. 2 to 12.

Figure 14:
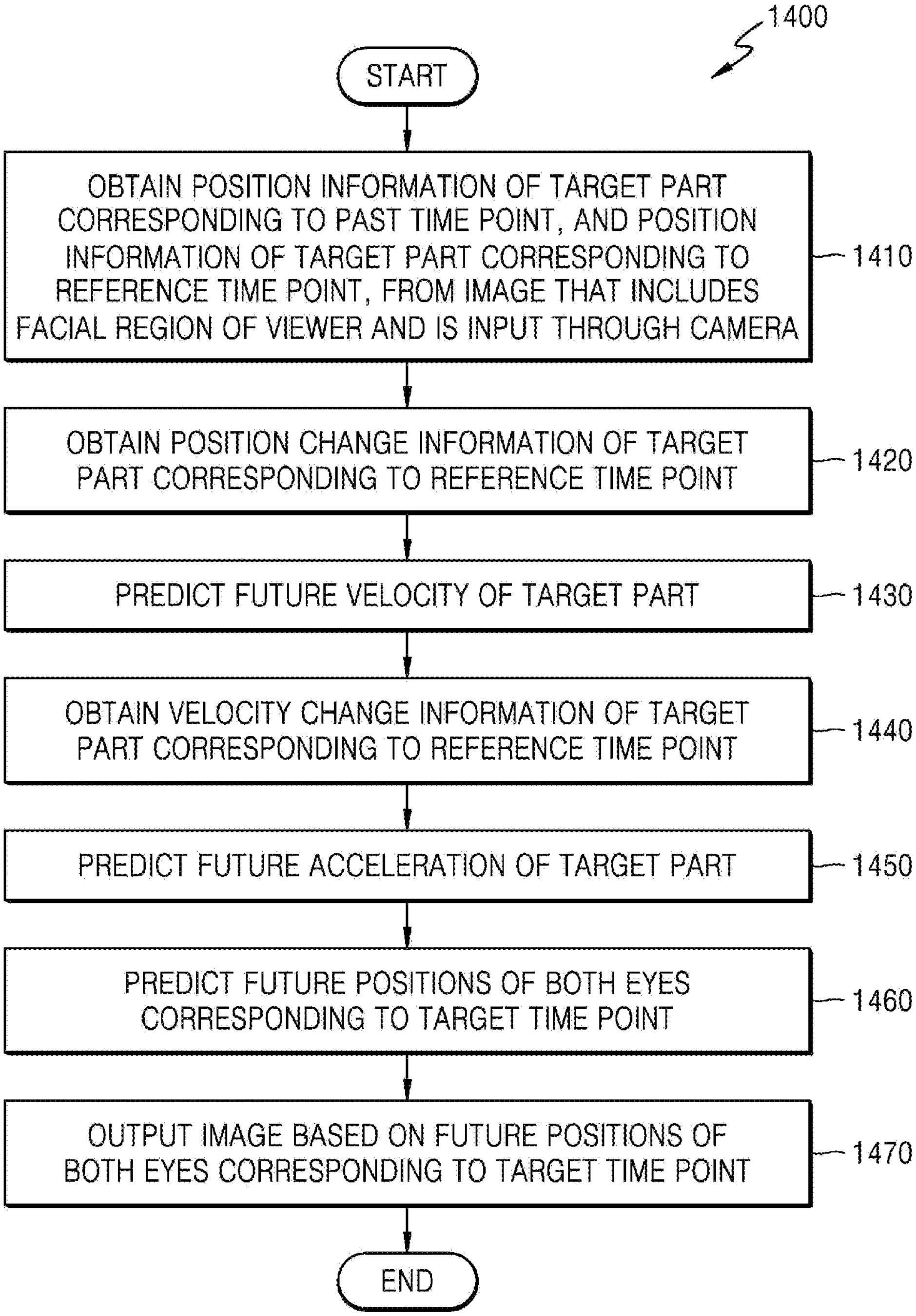
FIG. 14 is a diagram illustrating a method performed by an electronic device according to an embodiment of the disclosure.

FIG. 14 is a diagram illustrating a method performed by an electronic device according to an embodiment of the disclosure.

Referring to FIG. 14, redundant descriptions provided above with reference to any one of FIGS. 1 to 13 may be omitted.

FIG. 14 may illustrate an example of a method 1400 performed by an electronic device. In an embodiment of the disclosure, an electronic device performing the method 1400 may include a display device. Referring to FIG. 14, the method 1400 according to an embodiment of the disclosure may include operations 1410 to 1470. In an embodiment of the disclosure, operations 1410 to 1470 of the method 1400 may be performed by at least one processor included in the electronic device. The method 1400 is not limited to that illustrated in FIG. 14, and in one or more embodiments of the disclosure, the method 1400 may further include operations not illustrated in FIG. 14, or some operations may be omitted.

In operation 1410, the electronic device may obtain position information of a target part corresponding to a past time point, and position information of the target part corresponding to a reference time point, from an image that includes a facial region of a viewer and is input through a camera. In an embodiment of the disclosure, the electronic device may obtain raw position information of the target part corresponding to the reference time point from the image including the facial region of the viewer, and obtain position information of the target part corresponding to the reference time point based on the position information of the target part corresponding to the past time point and the raw position information of the target part.

In operation 1420, the electronic device may obtain position change information of the target part corresponding to the reference time point, based on the position information of the target part corresponding to the past time point and the position information of the target part corresponding to the reference time point. In an embodiment of the disclosure, the electronic device may obtain raw information about a change in the position of the target part corresponding to the reference time point based on the position information of the target part corresponding to the past time point and the position information of the target part corresponding to the reference time point, and obtain position change information of the target part corresponding to the reference time point based on a filtering strength determined based on the degree of movement of the target part, position change information of the target part corresponding to the past time point, and raw information about a change in the position of the target part.

In operation 1430, the electronic device may predict a future velocity of the target part based on the position change information of the target part corresponding to the reference time point and the position change information of the target part corresponding to the past time point.

In operation 1440, the electronic device may obtain velocity change information of the target part corresponding to the reference time point, based on the position change information of the target part corresponding to the reference time point, and the position change information of the target part corresponding to the past time point.

In operation 1450, the electronic device may predict a future acceleration of the target part based on the velocity change information of the target part corresponding to the reference time point, and velocity change information of the target part corresponding to the past time point. In an embodiment of the disclosure, the electronic device may obtain nonlinearly predicted acceleration information of the target part corresponding to the target time point based on the velocity change information of the target part corresponding to the reference time point, velocity change information of the target part corresponding to the past time point, and a parameter value determined based on a movement state of the viewer, and predict a future acceleration of the target part based on the nonlinearly predicted acceleration information and an acceleration of the target part that is predicted for a first time point prior to the target time point.

In operation 1460, the electronic device may predict future positions of both eyes corresponding to the target time point, based on the future velocity and the future acceleration. In an embodiment of the disclosure, the electronic device may predict a first future position of the target part corresponding to the target time point based on the future velocity and the future acceleration, and obtain a second future position of the target part corresponding to the target time point based on the first future position of the target part corresponding to the target time point and the future position of the target part corresponding to the first time point prior to the target time point. The electronic device may predict future positions of both eyes corresponding to the target time point based on the second future position of the target part. In an embodiment of the disclosure, the electronic device may predict a first future position of the center between both eyes corresponding to the target time point based on the future velocity and the future acceleration, and predict future positions of both eyes corresponding to the target time point based on the first future position of the center between both eyes corresponding to the target time point, and IPD information.

In an embodiment of the disclosure, the electronic device may obtain a scaling value for the future velocity based on the direction of the future velocity, and predict future positions of both eyes corresponding to the target time point based on the future velocity, the future acceleration, and the scaling value for the future velocity.

In operation 1470, the electronic device may output an image based on the future positions of both eyes corresponding to the target time point.

Figure 15:
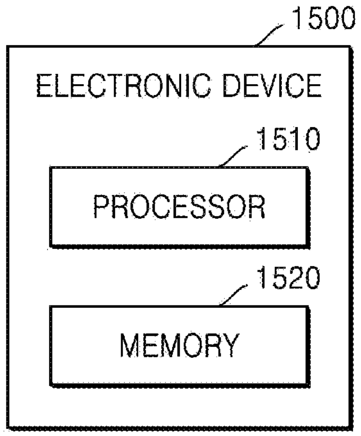
FIG. 15 is a diagram illustrating an example of an electronic device according to an embodiment of the disclosure.

FIG. 15 is a diagram illustrating an electronic device according to an embodiment of the disclosure.

Referring to FIG. 15, an electronic device 1500 may include, as a display device, an outdoor monitor, a gaming monitor, a television, an electronic picture frame, a notebook computer, a desktop computer, a wearable device, and the like. The electronic device 1500 illustrated in FIG. 15 is an electronic device capable of generating an output image and providing it to a display device, or providing a prediction result to a display device, and may include a set-top box, a console device, a video player device, and the like. In an embodiment of the disclosure, the electronic device 1500 may include, but is not limited to, at least one processor 1510 and memory 1520.

The processor 1510 may be electrically connected to the components included in the electronic device 1500 to perform computations or data processing for control and/or communication of the components included in the electronic device 1500. In an embodiment of the disclosure, the processor 1510 may load, into the memory, a request, a command, or data received from at least one of other components, process the request, command, or data, and store process result data in the memory. According to one or more embodiments of the disclosure, the processor 1510 may include at least one of general-purpose processors, such as a central processing unit (CPU), an application processor (AP), or a digital signal processor (DSP), dedicated graphics processors, such as a graphics processing unit (GPU) or a vision processing unit (VPU), or dedicated artificial intelligence processors, such as a neural processing unit (NPU).

The processor 1510 may process input data or control other components to process the input data according to data, operation rules, algorithms, methods, or models stored in the memory 1520. The processor 1510 may perform operations of predefined operation rules, algorithms, methods, or models stored in the memory 1520 by using input data.

The memory 1520 may be electrically connected to the processor 1510 and may store one or more modules, algorithms, operation rules, models, programs, instructions, or data associated with operations of components included in the electronic device 1500. For example, the memory 1520 may store one or more modules, algorithms, operating rules, models, programs, instructions, or data for the processor 1510 to perform processing and control. The memory 1520 may include, but is not limited to, at least one of flash memory-type storage medium, hard disk-type storage medium, multimedia card micro-type storage medium, card-type memory (e.g., SD or XD memory), random-access memory (RAM), static RAM (SRAM), read-only memory (ROM), electrically erasable programmable ROM (EEPROM), programmable ROM (PROM), magnetic memory, a magnetic disc, or an optical disc.

In an embodiment of the disclosure, the memory 1520 may store data and/or information that is identified, obtained, generated, or determined by the electronic device 1500. For example, the memory 1520 may store data and/or information that is identified, obtained, generated, or determined by the electronic device 1500 in a compressed form.

In an embodiment of the disclosure, the electronic device 1500 may include a module configured to perform (or used to perform) at least one operation. Some modules that perform at least one operation of the electronic device 1500 may include a plurality of sub-modules or may constitute one module.

Some modules that perform at least one operation of the electronic device 1500 may be implemented as hardware modules, software modules, and/or a combination thereof. A software module included in the electronic device 1500 may be included in the memory 1520. In an embodiment of the disclosure, a module included in the memory 1520 may be executed by the processor 1510 to perform an operation. For example, a module (i.e., a software module) included in the memory 1520 may be executed under control of or according to a command of the processor 1510, and may include a program, a model, or an algorithm configured to perform operations of deriving output data for input data.

The electronic device 1500 may include more components than those illustrated in FIG. 15. In an embodiment of the disclosure, the electronic device 1500 may further include a communication interface (or a communication module) for communicating with an external device. In an embodiment of the disclosure, the electronic device 1500 may further include an input device, an output device, and/or an input/output interface. For example, the input device of the electronic device 1500 may include a camera as an image input module. For example, the output device of an electronic device 1500 may include a display as an image output module. For example, the output device of the electronic device 1500 may include a lenticular lens.

In the disclosure, redundant descriptions provided above with reference to FIGS. 1 to 15 may have been omitted, and one or more embodiments described above with reference to FIGS. 1 to 15 may be applied/implemented in combination with each other. In the disclosure, the operations described as being performed by a module may be executed/performed by a device including or storing the module, or may be executed/performed under control of at least one processor of the device including the module. In the disclosure, the operations described as being performed by a device may be executed/performed by a module included or stored in the device, or may be performed under control of at least one processor of the device by using a module included or stored in the device.

In an embodiment of the disclosure, a method performed by an electronic device may include obtaining, by the electronic device, position information of a target part corresponding to a past time point, and position information of the target part corresponding to a reference time point, from an image that includes a facial region of a viewer and is input through a camera. In an embodiment of the disclosure, the method performed by an electronic device may include obtaining, by the electronic device, position change information of the target part corresponding to the reference time point, based on the position information of the target part corresponding to the past time point, and the position information of the target part corresponding to the reference time point. In an embodiment of the disclosure, the method performed by an electronic device may include predicting, by the electronic device, a future velocity of the target part based on the position change information of the target part corresponding to the reference time point, and position change information of the target part corresponding to the past time point. In an embodiment of the disclosure, the method performed by an electronic device may include obtaining, by the electronic device, velocity change information of the target part corresponding to the reference time point, based on the position change information of the target part corresponding to the reference time point, and the position change information of the target part corresponding to the past time point. In an embodiment of the disclosure, the method performed by an electronic device may include predicting, by the electronic device, a future acceleration of the target part based on the velocity change information of the target part corresponding to the reference time point, and velocity change information of the target part corresponding to the past time point. In an embodiment of the disclosure, the method performed by an electronic device may include predicting, by the electronic device, future positions of both eyes corresponding to a target time point based on the future velocity and the future acceleration. In an embodiment of the disclosure, the method performed by an electronic device may include outputting, by the electronic device, an image based on the future positions of the eyes corresponding to the target time point.

In an embodiment of the disclosure, the predicting of the future positions of the eyes corresponding to the target time point based on the future velocity and the future acceleration may include predicting a first future position of the target part corresponding to the target time point based on the future velocity and the future acceleration. In an embodiment of the disclosure, the predicting of the future positions of the eyes corresponding to the target time point based on the future velocity and the future acceleration may include obtaining a second future position of the target part corresponding to the target time point, based on the first future position of the target part corresponding to the target time point, and a future position of the target part corresponding to a first time point that is prior to the target time point. In an embodiment of the disclosure, the predicting of the future positions of the eyes corresponding to the target time point based on the future velocity and the future acceleration may include predicting the future positions of the eyes corresponding to the target time point based on the second future position of the target part.

In an embodiment of the disclosure, the predicting of the future positions of the eyes corresponding to the target time point based on the future velocity and the future acceleration may include predicting a first future position of a center between the eyes corresponding to the target time point based on the future velocity and the future acceleration. In an embodiment of the disclosure, the predicting of the future positions of the eyes corresponding to the target time point based on the future velocity and the future acceleration may include predicting the future positions of the eyes corresponding to the target time point based on IPD information and the first future position of the center between the eyes corresponding to the target time point.

In an embodiment of the disclosure, the obtaining of the position information of the target part corresponding to the past time point, and the position information of the target part corresponding to the reference time point, from the image that may include the facial region of the viewer and is input through the camera may include obtaining raw position information of the target part corresponding to the reference time point, from the image including the facial region of the viewer. In an embodiment of the disclosure, the obtaining of the position information of the target part corresponding to the past time point, and the position information of the target part corresponding to the reference time point, from the image that may include the facial region of the viewer and is input through the camera may include obtaining the position information of the target part corresponding to the reference time point, based on the position information of the target part corresponding to the past time point, and the raw position information of the target part.

In an embodiment of the disclosure, the obtaining of the position change information of the target part corresponding to the reference time point based on the position information of the target part corresponding to the past time point, and the position information of the target part corresponding to the reference time point may include obtaining raw information about a change in a position of the target part corresponding to the reference time point, based on the position information of the target part corresponding to the past time point, and the position information of the target part corresponding to the reference time point. In an embodiment of the disclosure, the obtaining of the position change information of the target part corresponding to the reference time point based on the position information of the target part corresponding to the past time point, and the position information of the target part corresponding to the reference time point may include obtaining the position change information of the target part corresponding to the reference time point, based on a filtering strength determined based on a degree of movement of the target part, the position change information of the target part corresponding to the past time point, and the raw information about the change in the position of the target part.

In an embodiment of the disclosure, the predicting of the future acceleration of the target part based on the velocity change information of the target part corresponding to the reference time point, and the velocity change information of the target part corresponding to the past time point may include obtaining nonlinearly predicted acceleration information of the target part corresponding to the target time point, based on the velocity change information of the target part corresponding to the reference time point, the velocity change information of the target part corresponding to the past time point, and a parameter value determined based on a movement state of the viewer. In an embodiment of the disclosure, the predicting of the future acceleration of the target part based on the velocity change information of the target part corresponding to the reference time point, and the velocity change information of the target part corresponding to the past time point may include predicting the future acceleration of the target part based on the nonlinearly predicted acceleration information and an acceleration of the target part that is predicted with respect to the first time point prior to the target time point. In an embodiment of the disclosure, the future acceleration of the target part may correspond to the target time point.

In an embodiment of the disclosure, the method may include obtaining a scaling value for the future velocity based on a direction of the future velocity. In an embodiment of the disclosure, the predicting of the future positions of the eyes corresponding to the target time point based on the future velocity and the future acceleration may include predicting the future positions of the eyes corresponding to the target time point, based on the future velocity, the future acceleration and the scaling value for the future velocity.

In an embodiment of the disclosure, the method may include obtaining a future position of the eyes corresponding to a second time point that is subsequent to the target time point. In an embodiment of the disclosure, the outputting of the image based on the future positions of the eyes corresponding to the target time point may include predicting future positions of the eyes with respect to the target time point, based on the future positions of the eyes corresponding to the target time point, and the future positions of the eyes corresponding to the second time point. In an embodiment of the disclosure, the outputting of the image based on the future positions of the eyes corresponding to the target time point may include outputting the image based on the future positions of the eyes with respect to the target time point.

In an embodiment of the disclosure, the method may include obtaining future positions of the eyes corresponding to a third time point that is between the target time point and the second time point. In an embodiment of the disclosure, the predicting of the future positions of the eyes with respect to the target time point, based on the future positions of the eyes corresponding to the target time point, and the future positions of the eyes corresponding to the second time point may include predicting the future positions of the eyes with respect to the target time point, based on the future positions of the eyes corresponding to the target time point, the future positions of the eyes corresponding to the second time point, and the future positions of the eyes corresponding to the third time point.

In an embodiment of the disclosure, the method may include predicting a future position of the center between the eyes corresponding to the target time point, based on a future acceleration of the center between both eyes, and a future velocity of the center between both eyes. In an embodiment of the disclosure, the target part may include at least one of a left eye or a right eye. In an embodiment of the disclosure, the outputting of the image based on the future positions of the eyes corresponding to the target time point may include predicting the future positions of the eyes with respect to the target time point, based on the future positions of the eyes corresponding to the target time point, and the future position of the center between the eyes corresponding to the target time point. In an embodiment of the disclosure, the outputting of the image based on the future positions of the eyes corresponding to the target time point may include outputting the image based on the future positions of the eyes with respect to the target time point.

In an embodiment of the disclosure, the predicting of the future positions of the eyes with respect to the target time point, based on the future positions of the eyes corresponding to the target time point, and the future position of the center between the eyes corresponding to the target time point may include predicting a future position of the center between the eyes with respect to the target time point, based on the future positions of the eyes corresponding to the target time point, and the future position of the center between the eyes corresponding to the target time point. In an embodiment of the disclosure, the predicting of the future positions of the eyes with respect to the target time point, based on the future positions of the eyes corresponding to the target time point, and the future position of the center between the eyes corresponding to the target time point may include filtering out noise from the future position of the center between the eyes with respect to the target time point. In an embodiment of the disclosure, the predicting of the future positions of the eyes with respect to the target time point, based on the future positions of the eyes corresponding to the target time point, and the future position of the center between the eyes corresponding to the target time point may include predicting the future positions of the eyes with respect to the target time point, based on the future position of the center between the eyes from which the noise is filtered out.

In an embodiment of the disclosure, one or more non-transitory computer-readable storage media storing one or more computer programs including computer-executable instructions that, when executed by one or more processors of an electronic device individually or collectively, cause the electronic device to perform operations may be provided. In an embodiment of the disclosure, the operations may include obtaining, by the electronic device, position information of a target part corresponding to a past time point, and position information of the target part corresponding to a reference time point, from an image that includes a facial region of a viewer and is input through a camera. In an embodiment of the disclosure, the operations may include obtaining, by the electronic device, position change information of the target part corresponding to the reference time point, based on the position information of the target part corresponding to the past time point, and the position information of the target part corresponding to the reference time point. In an embodiment of the disclosure, the operations may include predicting, by the electronic device, a future velocity of the target part based on the position change information of the target part corresponding to the reference time point, and position change information of the target part corresponding to the past time point. In an embodiment of the disclosure, the operations may include obtaining, by the electronic device, velocity change information of the target part corresponding to the reference time point, based on the position change information of the target part corresponding to the reference time point, and the position change information of the target part corresponding to the past time point. In an embodiment of the disclosure, the operations may include predicting, by the electronic device, a future acceleration of the target part based on the velocity change information of the target part corresponding to the reference time point, and velocity change information of the target part corresponding to the past time point. In an embodiment of the disclosure, the operations may include predicting, by the electronic device, future positions of both eyes corresponding to a target time point based on the future velocity and the future acceleration. In an embodiment of the disclosure, the operations may include outputting, by the electronic device, an image based on the future positions of the eyes corresponding to the target time point.

In an embodiment of the disclosure, an electronic device may include memory storing one or more computer programs and one or more processors communicatively coupled to the memory. In an embodiment of the disclosure, the one or more computer programs may include computer-executable instructions that, when executed by the one or more processors individually or collectively, cause the electronic device to obtain position information of a target part corresponding to a past time point, and position information of the target part corresponding to a reference time point, from an image that may include a facial region of a viewer and is input through a camera. In an embodiment of the disclosure, the one or more computer programs may include computer-executable instructions that, when executed by the one or more processors individually or collectively, cause the electronic device to obtain position change information of the target part corresponding to the reference time point, based on the position information of the target part corresponding to the past time point, and the position information of the target part corresponding to the reference time point. In an embodiment of the disclosure, the one or more computer programs may include computer-executable instructions that, when executed by the one or more processors individually or collectively, cause the electronic device to predict a future velocity of the target part based on the position change information of the target part corresponding to the reference time point, and position change information of the target part corresponding to the past time point. In an embodiment of the disclosure, the one or more computer programs may include computer-executable instructions that, when executed by the one or more processors individually or collectively, cause the electronic device to obtain velocity change information of the target part corresponding to the reference time point, based on the position change information of the target part corresponding to the reference time point, and the position change information of the target part corresponding to the past time point. In an embodiment of the disclosure, the one or more computer programs may include computer-executable instructions that, when executed by the one or more processors individually or collectively, cause the electronic device to predict a future acceleration of the target part based on the velocity change information of the target part corresponding to the reference time point, and velocity change information of the target part corresponding to the past time point. In an embodiment of the disclosure, the one or more computer programs may include computer-executable instructions that, when executed by the one or more processors individually or collectively, cause the electronic device to predict future positions of both eyes corresponding to a target time point based on the future velocity and the future acceleration. In an embodiment of the disclosure, the one or more computer programs may include computer-executable instructions that, when executed by the one or more processors individually or collectively, cause the electronic device to output an image based on the future positions of the eyes corresponding to the target time point.

In an embodiment of the disclosure, the one or more computer programs may include computer-executable instructions that, when executed by the one or more processors individually or collectively, cause the electronic device to predict a first future position of the target part corresponding to the target time point based on the future velocity and the future acceleration. In an embodiment of the disclosure, the one or more computer programs may include computer-executable instructions that, when executed by the one or more processors individually or collectively, cause the electronic device to obtain a second future position of the target part corresponding to the target time point, based on the first future position of the target part corresponding to the target time point, and a future position of the target part corresponding to a first time point that is prior to the target time point. In an embodiment of the disclosure, the one or more computer programs may include computer-executable instructions that, when executed by the one or more processors individually or collectively, cause the electronic device to predict the future positions of the eyes corresponding to the target time point based on the second future position of the target part.

In an embodiment of the disclosure, the one or more computer programs may include computer-executable instructions that, when executed by the one or more processors individually or collectively, cause the electronic device to predict a first future position of a center between the eyes corresponding to the target time point based on the future velocity and the future acceleration. In an embodiment of the disclosure, the one or more computer programs may include computer-executable instructions that, when executed by the one or more processors individually or collectively, cause the electronic device to predict the future positions of the eyes corresponding to the target time point based on IPD information and the first future position of the center between the eyes corresponding to the target time point.

In an embodiment of the disclosure, the one or more computer programs may include computer-executable instructions that, when executed by the one or more processors individually or collectively, cause the electronic device to obtain raw position information of the target part corresponding to the reference time point, from the image including the facial region of the viewer. In an embodiment of the disclosure, the one or more computer programs may include computer-executable instructions that, when executed by the one or more processors individually or collectively, cause the electronic device to obtain the position information of the target part corresponding to the reference time point, based on the position information of the target part corresponding to the past time point, and the raw position information of the target part.

In an embodiment of the disclosure, the one or more computer programs may include computer-executable instructions that, when executed by the one or more processors individually or collectively, cause the electronic device to obtain raw information about a change in a position of the target part corresponding to the reference time point, based on the position information of the target part corresponding to the past time point, and the position information of the target part corresponding to the reference time point. In an embodiment of the disclosure, the one or more computer programs may include computer-executable instructions that, when executed by the one or more processors individually or collectively, cause the electronic device to obtain the position change information of the target part corresponding to the reference time point, based on a filtering strength determined based on a degree of movement of the target part, the position change information of the target part corresponding to the past time point, and the raw information about the change in the position of the target part.

In an embodiment of the disclosure, the one or more computer programs may include computer-executable instructions that, when executed by the one or more processors individually or collectively, cause the electronic device to obtain nonlinearly predicted acceleration information of the target part corresponding to the target time point, based on the velocity change information of the target part corresponding to the reference time point, the velocity change information of the target part corresponding to the past time point, and a parameter value determined based on a movement state of the viewer. In an embodiment of the disclosure, the one or more computer programs may include computer-executable instructions that, when executed by the one or more processors individually or collectively, cause the electronic device to predict the future acceleration of the target part based on the nonlinearly predicted acceleration information and an acceleration of the target part that is predicted with respect to the first time point prior to the target time point. In an embodiment of the disclosure, the future acceleration of the target part may correspond to the target time point.

In an embodiment of the disclosure, the one or more computer programs may include computer-executable instructions that, when executed by the one or more processors individually or collectively, cause the electronic device to obtain a scaling value for the future velocity based on a direction of the future velocity. In an embodiment of the disclosure, the one or more computer programs may include computer-executable instructions that, when executed by the one or more processors individually or collectively, cause the electronic device to predict the future positions of the eyes corresponding to the target time point, based on the future velocity, the future acceleration and the scaling value for the future velocity.

In an embodiment of the disclosure, the one or more computer programs may include computer-executable instructions that, when executed by the one or more processors individually or collectively, cause the electronic device to obtain a future position of the eyes corresponding to a second time point that is subsequent to the target time point. In an embodiment of the disclosure, the one or more computer programs may include computer-executable instructions that, when executed by the one or more processors individually or collectively, cause the electronic device to predict future positions of the eyes with respect to the target time point, based on the future positions of the eyes corresponding to the target time point, and the future positions of the eyes corresponding to the second time point. In an embodiment of the disclosure, the one or more computer programs may include computer-executable instructions that, when executed by the one or more processors individually or collectively, cause the electronic device to output the image based on the future positions of the eyes with respect to the target time point.

In an embodiment of the disclosure, the one or more computer programs may include computer-executable instructions that, when executed by the one or more processors individually or collectively, cause the electronic device to obtain future positions of the eyes corresponding to a third time point that is between the target time point and the second time point. In an embodiment of the disclosure, the one or more computer programs may include computer-executable instructions that, when executed by the one or more processors individually or collectively, cause the electronic device to predict the future positions of the eyes with respect to the target time point, based on the future positions of the eyes corresponding to the target time point, the future positions of the eyes corresponding to the second time point, and the future positions of the eyes corresponding to the third time point.

In an embodiment of the disclosure, the one or more computer programs may include computer-executable instructions that, when executed by the one or more processors individually or collectively, cause the electronic device to predict a future position of the center between the eyes corresponding to the target time point, based on a future acceleration of the center between both eyes, and a future velocity of the center between both eyes. In an embodiment of the disclosure, the target part may include at least one of a left eye or a right eye. In an embodiment of the disclosure, the one or more computer programs may include computer-executable instructions that, when executed by the one or more processors individually or collectively, cause the electronic device to predict the future positions of the eyes with respect to the target time point, based on the future positions of the eyes corresponding to the target time point, and the future position of the center between the eyes corresponding to the target time point. In an embodiment of the disclosure, the one or more computer programs may include computer-executable instructions that, when executed by the one or more processors individually or collectively, cause the electronic device to output the image based on the future positions of the eyes with respect to the target time point.

In an embodiment of the disclosure, the one or more computer programs may include computer-executable instructions that, when executed by the one or more processors individually or collectively, cause the electronic device to predict a future position of the center between the eyes with respect to the target time point, based on the future positions of the eyes corresponding to the target time point, and the future position of the center between the eyes corresponding to the target time point. In an embodiment of the disclosure, the one or more computer programs may include computer-executable instructions that, when executed by the one or more processors individually or collectively, cause the electronic device to filter out noise from the future position of the center between the eyes with respect to the target time point. In an embodiment of the disclosure, the one or more computer programs may include computer-executable instructions that, when executed by the one or more processors individually or collectively, cause the electronic device to predict the future positions of the eyes with respect to the target time point, based on the future position of the center between the eyes from which the noise is filtered out.

A machine-readable storage medium may be provided in the form of a non-transitory storage medium. Here, the term 'non-transitory storage medium' refers to a tangible device and does not include a signal (e.g., an electromagnetic wave), and the term 'non-transitory storage medium' does not distinguish between a case where data is stored in a storage medium semi-permanently and a case where data is stored temporarily. For example, the 'non-transitory storage medium' may include a buffer in which data is temporarily stored.

According to an embodiment of the disclosure, methods according to one or more embodiments disclosed herein may be included in a computer program product and then provided. The computer program product may be traded as commodities between sellers and buyers. The computer program product may be distributed in the form of a machine-readable storage medium (e.g., compact disc ROM (CD-ROM)), or may be distributed online (e.g., downloaded or uploaded) through an application store or directly between two viewer devices (e.g., smart phones). In a case of online distribution, at least a portion of the computer program product (e.g., a downloadable app) may be temporarily stored in a machine-readable storage medium, such as a manufacturer's server, an application store's server, or memory of a relay server.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage, such as, for example, a storage device like read only memory (ROM), whether erasable or rewritable or not, or in the form of memory, such as, for example, random access memory (RAM), memory chips, device or integrated circuits or on an optically or magnetically readable medium, such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an electronic device, the method comprising:

obtaining, by the electronic device, position information of a target part corresponding to a past time point, and position information of the target part corresponding to a reference time point, from an image that includes a facial region of a viewer and is input through a camera;

obtaining, by the electronic device, position change information of the target part corresponding to the reference time point, based on the position information of the target part corresponding to the past time point, and the position information of the target part corresponding to the reference time point;

predicting, by the electronic device, a future velocity of the target part based on the position change information of the target part corresponding to the reference time point, and position change information of the target part corresponding to the past time point;

obtaining, by the electronic device, velocity change information of the target part corresponding to the reference time point, based on the position change information of the target part corresponding to the reference time point, and the position change information of the target part corresponding to the past time point;

predicting, by the electronic device, a future acceleration of the target part based on the velocity change information of the target part corresponding to the reference time point, velocity change information of the target part corresponding to the past time point, and a movement state of the viewer, the movement state of the viewer being one among the viewer being stationary and the viewer moving;

predicting, by the electronic device, future positions of eyes corresponding to a target time point based on the future velocity and the future acceleration; and outputting, by the electronic device, an image based on the future positions of the eyes corresponding to the target time point.

2. The method of claim 1, wherein the predicting of the future positions of the eyes corresponding to the target time point based on the future velocity and the future acceleration comprises:

predicting a first future position of the target part corresponding to the target time point based on the future velocity and the future acceleration;

obtaining a second future position of the target part corresponding to the target time point, based on the first future position of the target part corresponding to the target time point, and a future position of the target part corresponding to a first time point that is prior to the target time point; and predicting the future positions of the eyes corresponding to the target time point based on the second future position of the target part.

3. The method of claim 1, wherein the predicting of the future positions of the eyes corresponding to the target time point based on the future velocity and the future acceleration comprises:

predicting a first future position of a center between the eyes corresponding to the target time point based on the future velocity and the future acceleration; and predicting the future positions of the eyes corresponding to the target time point based on interpupillary distance (IPD) information and the first future position of the center between the eyes corresponding to the target time point.

4. The method of claim 1, wherein the obtaining of the position information of the target part corresponding to the past time point, and the position information of the target part corresponding to the reference time point, from the image that includes the facial region of the viewer and is input through the camera comprises:

obtaining raw position information of the target part corresponding to the reference time point, from the image including the facial region of the viewer; and obtaining the position information of the target part corresponding to the reference time point, based on the position information of the target part corresponding to the past time point, and the raw position information of the target part.

5. The method of claim 1, wherein the obtaining of the position change information of the target part corresponding to the reference time point based on the position information of the target part corresponding to the past time point, and the position information of the target part corresponding to the reference time point comprises:

obtaining raw information about a change in a position of the target part corresponding to the reference time point, based on the position information of the target part corresponding to the past time point, and the position information of the target part corresponding to the reference time point; and obtaining the position change information of the target part corresponding to the reference time point, based on a filtering strength determined based on a degree of movement of the target part, the position change information of the target part corresponding to the past time point, and the raw information about the change in the position of the target part.

6. The method of claim 1, wherein the predicting of the future acceleration of the target part based on the velocity change information of the target part corresponding to the reference time point, and the velocity change information of the target part corresponding to the past time point comprises:

obtaining nonlinearly predicted acceleration information of the target part corresponding to the target time point, based on the velocity change information of the target part corresponding to the reference time point, the velocity change information of the target part corresponding to the past time point, and a parameter value determined based on the movement state of the viewer; and predicting the future acceleration of the target part based on the nonlinearly predicted acceleration information and an acceleration of the target part that is predicted with respect to a first time point prior to the target time point, wherein the future acceleration of the target part corresponds to the target time point.

7. The method of claim 1, further comprising:

obtaining a scaling value for the future velocity based on a direction of the future velocity, wherein the predicting of the future positions of the eyes corresponding to the target time point based on the future velocity and the future acceleration comprises predicting the future positions of the eyes corresponding to the target time point, based on the future velocity, the future acceleration and the scaling value for the future velocity.

8. The method of claim 1, further comprising:

obtaining a future position of the eyes corresponding to a second time point that is subsequent to the target time point, wherein the outputting of the image based on the future positions of the eyes corresponding to the target time point comprises:

predicting future positions of the eyes with respect to the target time point, based on the future positions of the eyes corresponding to the target time point, and the future positions of the eyes corresponding to the second time point; and outputting the image based on the future positions of the eyes with respect to the target time point.

9. The method of claim 8, further comprising:

obtaining future positions of the eyes corresponding to a third time point that is between the target time point and the second time point, wherein the predicting of the future positions of the eyes with respect to the target time point, based on the future positions of the eyes corresponding to the target time point, and the future positions of the eyes corresponding to the second time point comprises predicting the future positions of the eyes with respect to the target time point, based on the future positions of the eyes corresponding to the target time point, the future positions of the eyes corresponding to the second time point, and the future positions of the eyes corresponding to the third time point.

10. The method of claim 1, further comprising:

predicting a future position of a center between the eyes corresponding to the target time point, based on a future acceleration of the center between the eyes, and a future velocity of the center between the eyes, wherein the target part comprises at least one of a left eye or a right eye, and wherein the outputting of the image based on the future positions of the eyes corresponding to the target time point comprises:

predicting the future positions of the eyes with respect to the target time point, based on the future positions of the eyes corresponding to the target time point, and the future position of the center between the eyes corresponding to the target time point, and outputting the image based on the future positions of the eyes with respect to the target time point.

11. The method of claim 10, wherein the predicting of the future positions of the eyes with respect to the target time point, based on the future positions of the eyes corresponding to the target time point, and the future position of the center between the eyes corresponding to the target time point comprises:

predicting a future position of the center between the eyes with respect to the target time point, based on the future positions of the eyes corresponding to the target time point, and the future position of the center between the eyes corresponding to the target time point;

filtering out noise from the future position of the center between the eyes with respect to the target time point; and predicting the future positions of the eyes with respect to the target time point, based on the future position of the center between the eyes from which the noise is filtered out.

12. One or more non-transitory computer-readable storage media storing one or more computer programs including computer-executable instructions that, when executed by one or more processors of an electronic device individually or collectively, cause the electronic device to perform operations, the operations comprising:

obtaining, by the electronic device, position information of a target part corresponding to a past time point, and position information of the target part corresponding to a reference time point, from an image that includes a facial region of a viewer and is input through a camera;

obtaining, by the electronic device, position change information of the target part corresponding to the reference time point, based on the position information of the target part corresponding to the past time point, and the position information of the target part corresponding to the reference time point;

predicting, by the electronic device, a future velocity of the target part based on the position change information of the target part corresponding to the reference time point, and position change information of the target part corresponding to the past time point;

obtaining, by the electronic device, velocity change information of the target part corresponding to the reference time point, based on the position change information of the target part corresponding to the reference time point, and the position change information of the target part corresponding to the past time point;

predicting, by the electronic device, a future acceleration of the target part based on the velocity change information of the target part corresponding to the reference time point, velocity change information of the target part corresponding to the past time point, and a movement state of the viewer, the movement state of the viewer being one among the viewer being stationary and the viewer moving;

predicting, by the electronic device, future positions of eyes corresponding to a target time point based on the future velocity and the future acceleration; and outputting, by the electronic device, an image based on the future positions of the eyes corresponding to the target time point.

13. An electronic device comprising:

memory storing one or more computer programs; and one or more processors communicatively coupled to the memory, wherein the one or more computer programs include computer-executable instructions that, when executed by the one or more processors individually or collectively, cause the electronic device to:

obtain position information of a target part corresponding to a past time point, and position information of the target part corresponding to a reference time point, from an image that includes a facial region of a viewer and is input through a camera, obtain position change information of the target part corresponding to the reference time point, based on the position information of the target part corresponding to the past time point, and the position information of the target part corresponding to the reference time point, predict a future velocity of the target part based on the position change information of the target part corresponding to the reference time point, and position change information of the target part corresponding to the past time point, obtain velocity change information of the target part corresponding to the reference time point, based on the position change information of the target part corresponding to the reference time point, and the position change information of the target part corresponding to the past time point, predict a future acceleration of the target part based on the velocity change information of the target part corresponding to the reference time point, velocity change information of the target part corresponding to the past time point, and a movement state of the viewer, the movement state of the viewer being one among the viewer being stationary and the viewer moving, predict future positions of eyes corresponding to a target time point based on the future velocity and the future acceleration, and output an image based on the future positions of the eyes corresponding to the target time point.

14. The electronic device of claim 13, wherein the one or more computer programs further include computer-executable instructions that, when executed by the one or more processors individually or collectively, cause the electronic device to:

predict a first future position of the target part corresponding to the target time point based on the future velocity and the future acceleration, obtain a second future position of the target part corresponding to the target time point, based on the first future position of the target part corresponding to the target time point, and a future position of the target part corresponding to a first time point that is prior to the target time point, and predict the future positions of the eyes corresponding to the target time point based on the second future position of the target part.

15. The electronic device of claim 13, wherein the one or more computer programs further include computer-executable instructions that, when executed by the one or more processors individually or collectively, cause the electronic device to:

predict a first future position of a center between the eyes corresponding to the target time point based on the future velocity and the future acceleration, and predict the future positions of the eyes corresponding to the target time point based on interpupillary distance (IPD) information and the first future position of the center between the eyes corresponding to the target time point.

16. The electronic device of claim 13, wherein the one or more computer programs further include computer-executable instructions that, when executed by the one or more processors individually or collectively, cause the electronic device to:

obtain raw position information of the target part corresponding to the reference time point, from the image including the facial region of the viewer, and obtain the position information of the target part corresponding to the reference time point, based on the position information of the target part corresponding to the past time point, and the raw position information of the target part.

17. The electronic device of claim 13, wherein the one or more computer programs further include computer-executable instructions that, when executed by the one or more processors individually or collectively, cause the electronic device to:

obtain raw information about a change in a position of the target part corresponding to the reference time point, based on the position information of the target part corresponding to the past time point, and the position information of the target part corresponding to the reference time point, and obtain the position change information of the target part corresponding to the reference time point, based on a filtering strength determined based on a degree of movement of the target part, the position change information of the target part corresponding to the past time point, and the raw information about the change in the position of the target part.

18. The electronic device of claim 13, wherein the one or more computer programs further include computer-executable instructions that, when executed by the one or more processors individually or collectively, cause the electronic device to:

obtain nonlinearly predicted acceleration information of the target part corresponding to the target time point, based on the velocity change information of the target part corresponding to the reference time point, the velocity change information of the target part corresponding to the past time point, and a parameter value determined based on the movement state of the viewer, and predict the future acceleration of the target part based on the nonlinearly predicted acceleration information and an acceleration of the target part that is predicted with respect to a first time point prior to the target time point, wherein the future acceleration of the target part corresponds to the target time point.

19. The electronic device of claim 13, wherein the one or more computer programs further include computer-executable instructions that, when executed by the one or more processors individually or collectively, cause the electronic device to:

obtain a scaling value for the future velocity based on a direction of the future velocity, and predict the future positions of the eyes corresponding to the target time point, based on the future velocity, the future acceleration and the scaling value for the future velocity.

20. The electronic device of claim 13, wherein the one or more computer programs further include computer-executable instructions that, when executed by the one or more processors individually or collectively, cause the electronic device to:

obtain a future position of the eyes corresponding to a second time point that is subsequent to the target time point, predict future positions of the eyes with respect to the target time point, based on the future positions of the eyes corresponding to the target time point, and the future positions of the eyes corresponding to the second time point, and output the image based on the future positions of the eyes with respect to the target time point.

* * * * *